July 7, 1964  J. T. WALLACE  3,140,009
ARTICLE STORAGE AND RETRIEVAL DEVICE
Filed May 31, 1961  26 Sheets-Sheet 1

INVENTOR.
JOHN T. WALLACE
BY R. Frank Smith
Lloyd F. Seebach
ATTORNEY & AGENT

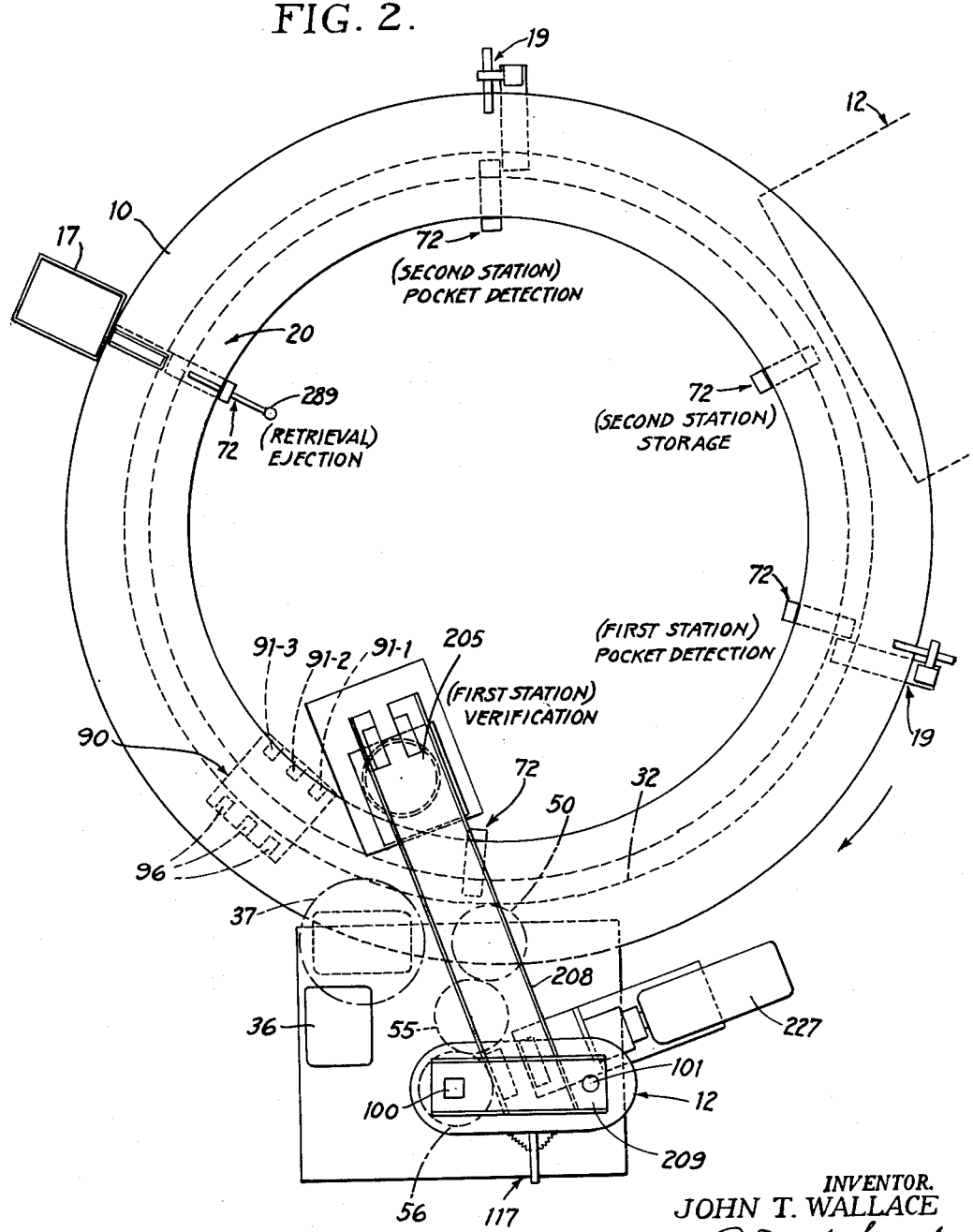

July 7, 1964     J. T. WALLACE     3,140,009
ARTICLE STORAGE AND RETRIEVAL DEVICE
Filed May 31, 1961     26 Sheets-Sheet 4

INVENTOR.
JOHN T. WALLACE
BY R. Frank Smith
Lloyd F. Seebach
ATTORNEY & AGENT

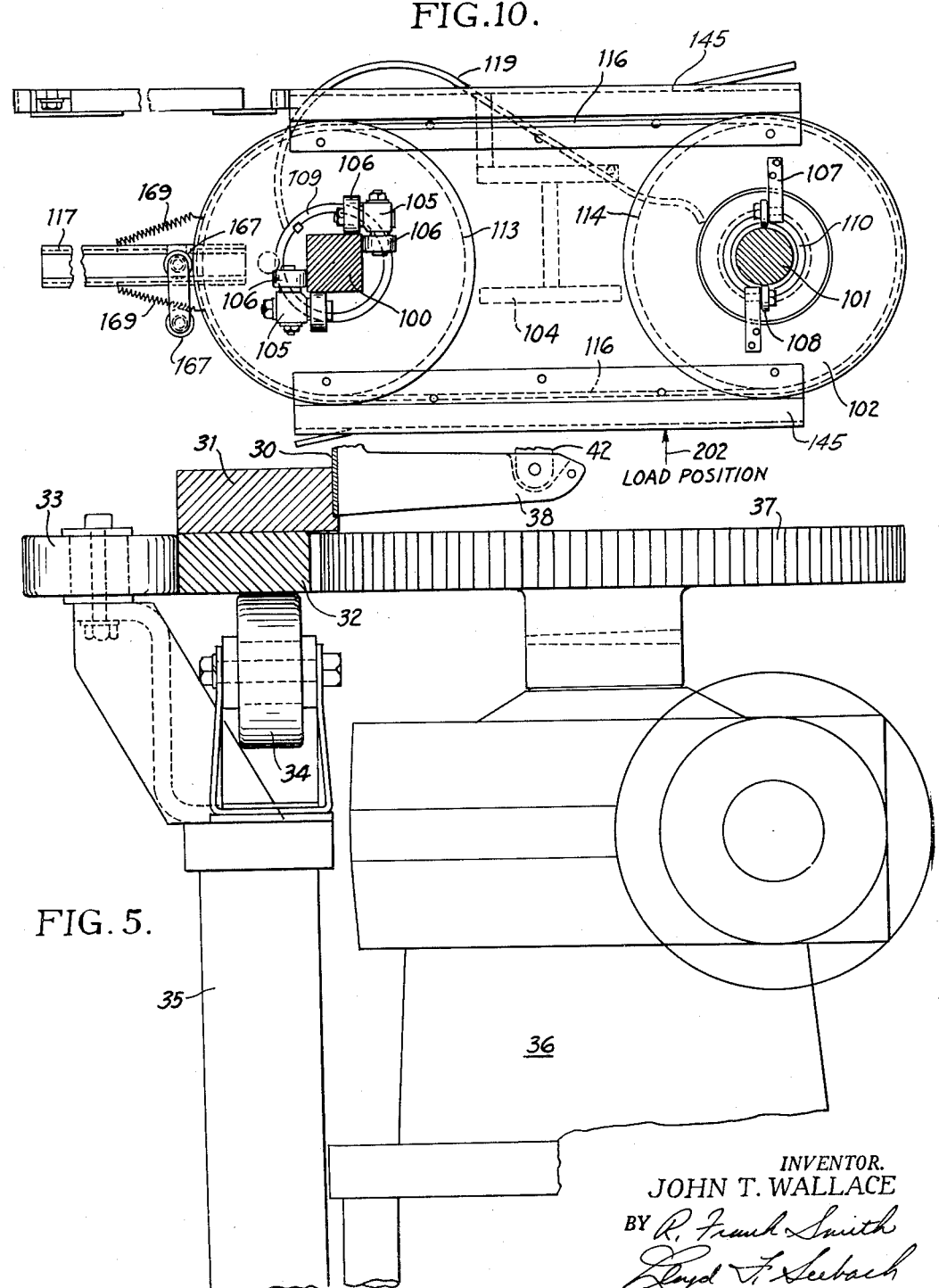

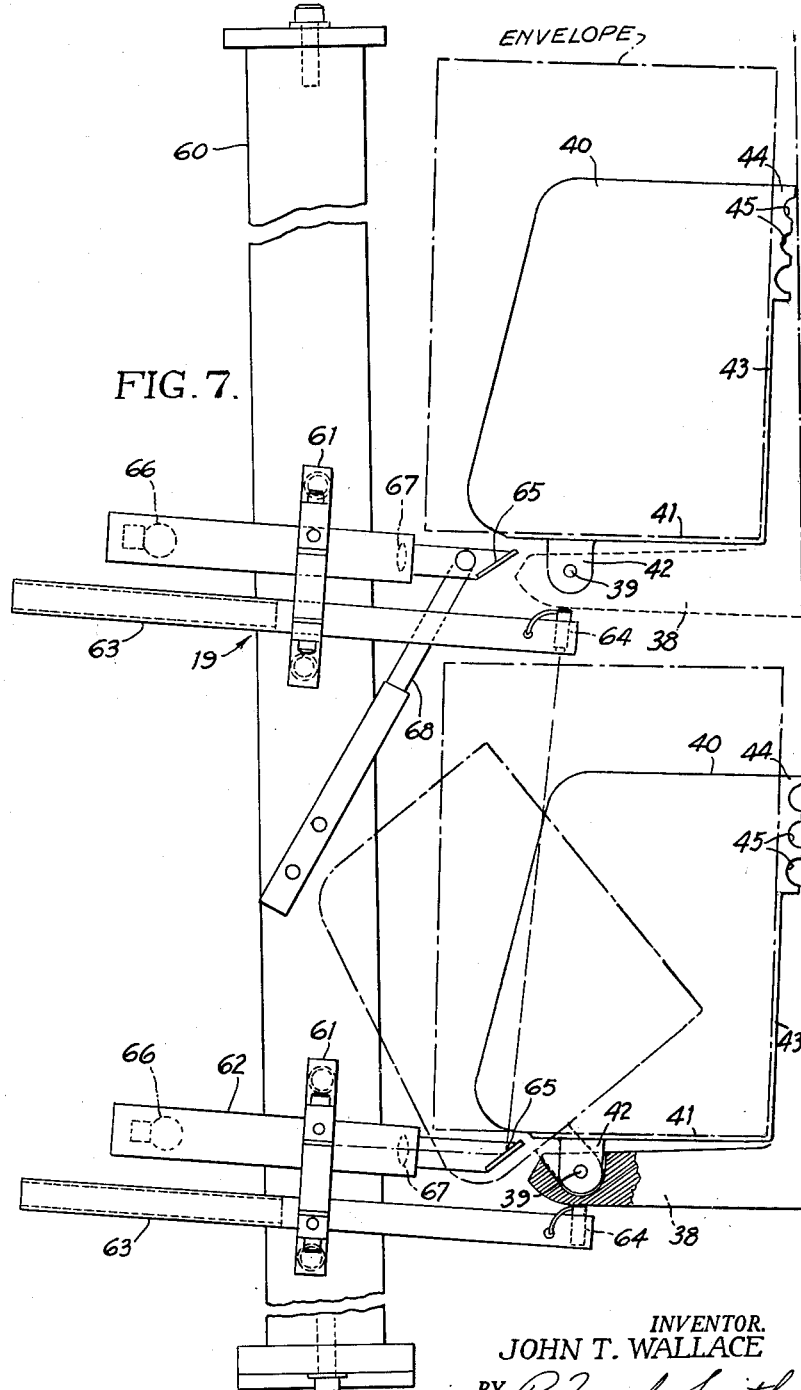

July 7, 1964

J. T. WALLACE 3,140,009

ARTICLE STORAGE AND RETRIEVAL DEVICE

Filed May 31, 1961

*INVENTOR.*
JOHN T. WALLACE
BY R. Frank Smith
Lloyd F. Leebach
ATTORNEY & AGENT

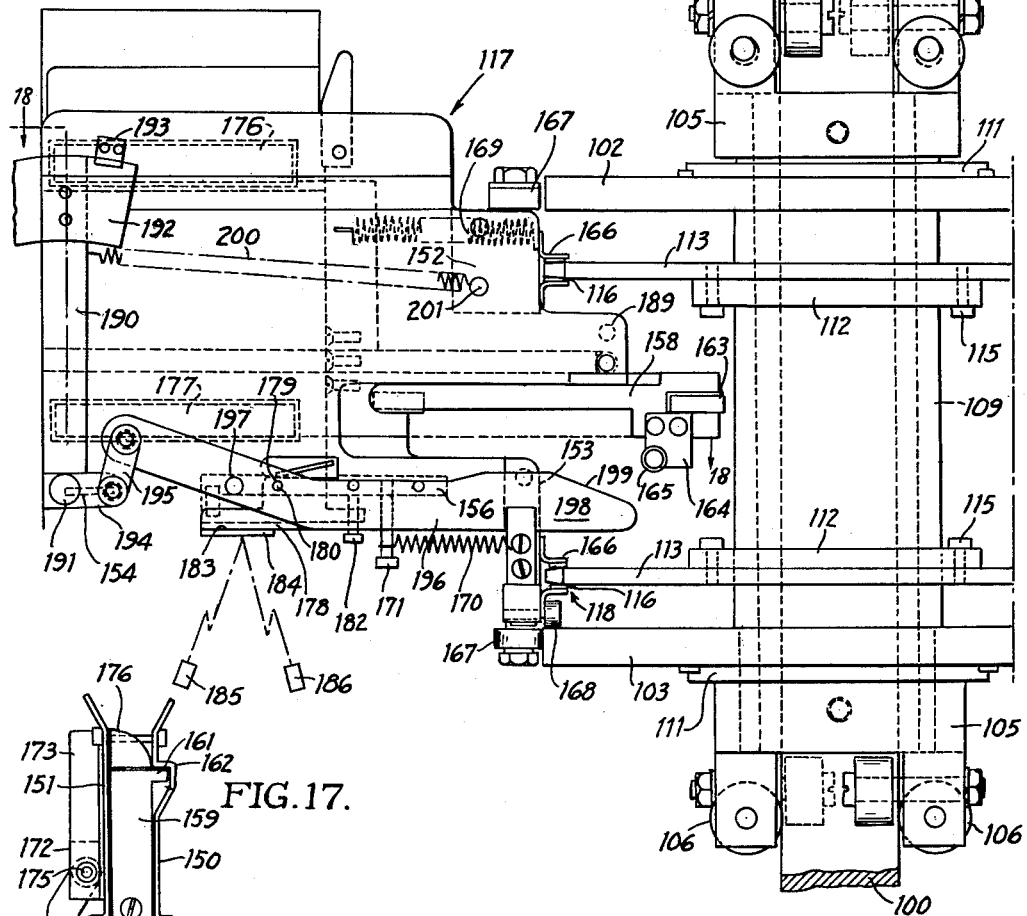

July 7, 1964   J. T. WALLACE   3,140,009
ARTICLE STORAGE AND RETRIEVAL DEVICE
Filed May 31, 1961   26 Sheets-Sheet 11
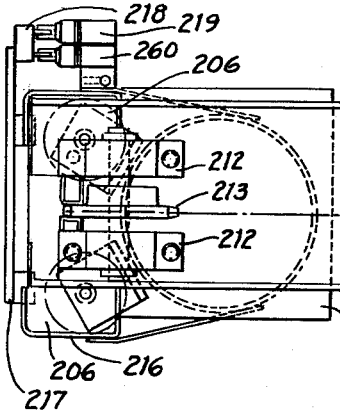
FIG. 19.
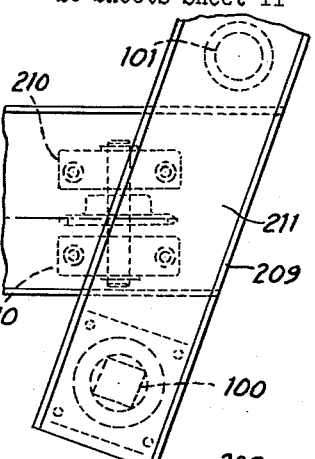
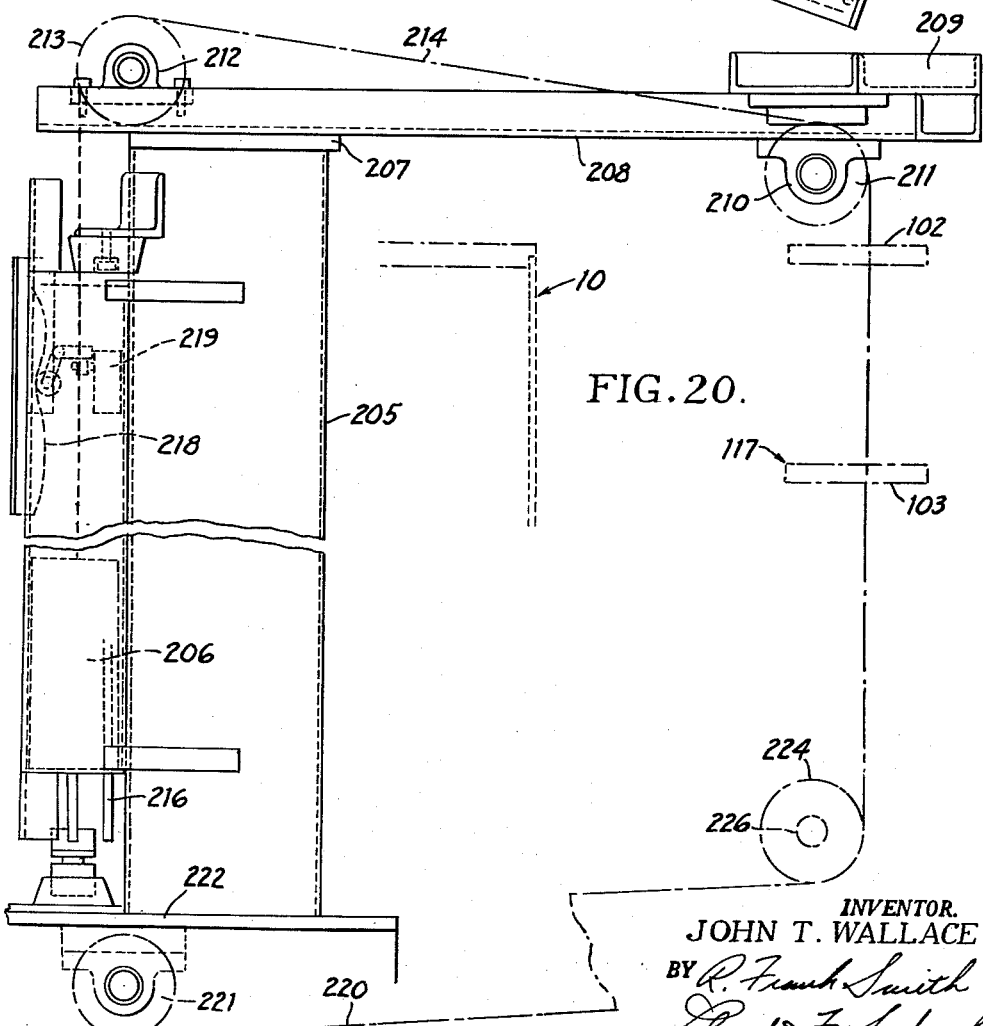
FIG. 20.
INVENTOR.
JOHN T. WALLACE
BY
ATTORNEY & AGENT July 7, 1964

J. T. WALLACE 3,140,009

ARTICLE STORAGE AND RETRIEVAL DEVICE

Filed May 31, 1961

INVENTOR.
JOHN T. WALLACE
BY R. Frank Smith
Lloyd F. Seebach
ATTORNEY & AGENT

July 7, 1964 J. T. WALLACE 3,140,009
ARTICLE STORAGE AND RETRIEVAL DEVICE
Filed May 31, 1961 26 Sheets-Sheet 19

INVENTOR.
JOHN T. WALLACE
BY R. Frank Smith
Lloyd F. Seebach
ATTORNEY & AGENT

July 7, 1964

J. T. WALLACE 3,140,009

ARTICLE STORAGE AND RETRIEVAL DEVICE

Filed May 31, 1961

INVENTOR.
JOHN T. WALLACE
BY R. Frank Smith
Lloyd F. Seebach
ATTORNEY & AGENT

July 7, 1964     J. T. WALLACE     3,140,009
ARTICLE STORAGE AND RETRIEVAL DEVICE
Filed May 31, 1961     26 Sheets-Sheet 23

INVENTOR.
JOHN T. WALLACE
BY R. Frank Smith
Lloyd F. Seubach
ATTORNEY & AGENT

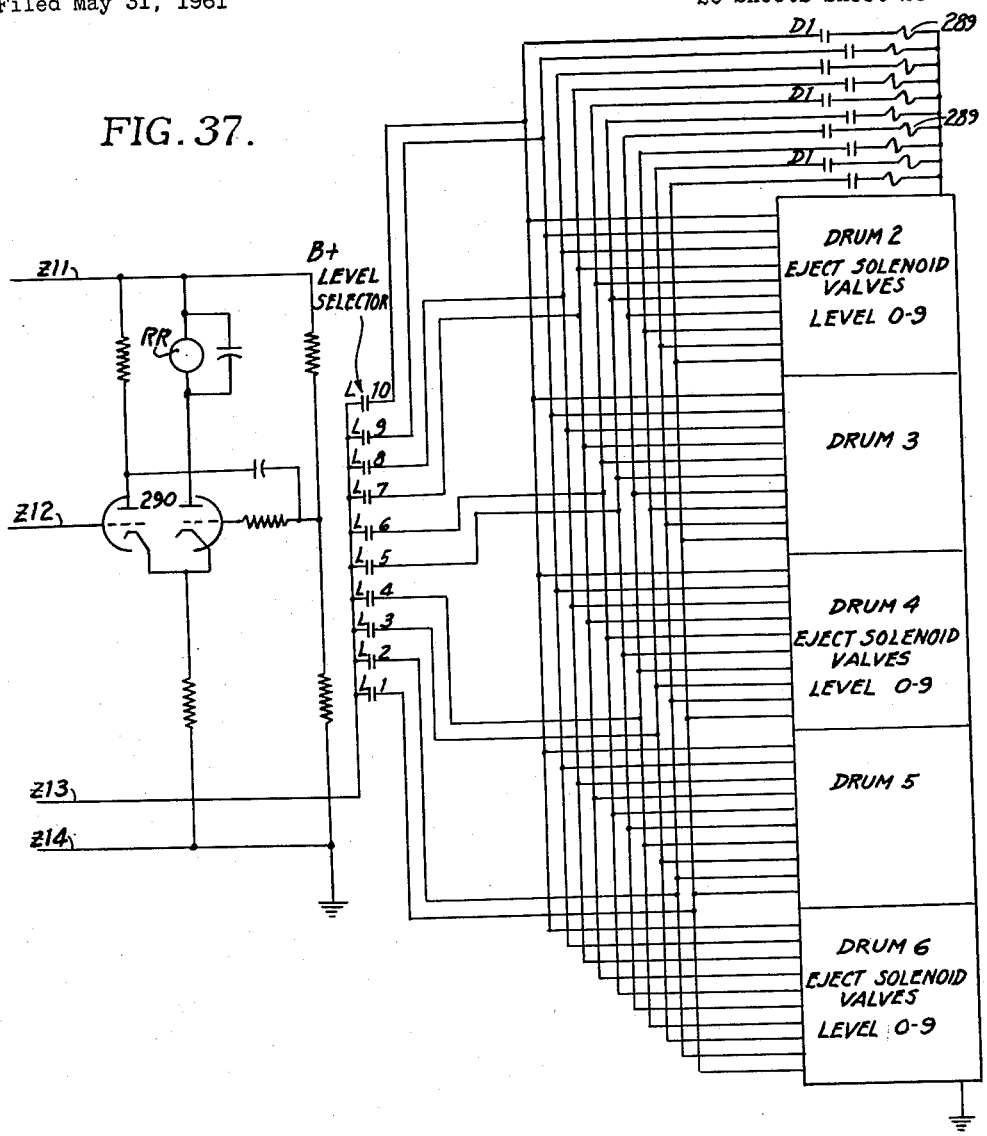

United States Patent Office 3,140,009
Patented July 7, 1964

3,140,009
ARTICLE STORAGE AND RETRIEVAL DEVICE
John T. Wallace, Rochester, N.Y., assignor to Eastman Kodak Company, Rochester, N.Y., a corporation of New Jersey
Filed May 31, 1961, Ser. No. 113,921
30 Claims. (Cl. 221—2)

The present invention relates to an automatic storage and retrieval device and more particularly to a storage and retrieval device for articles which can be readily accepted by, stored and retrieved from any one of a number of pockets arranged in tiers circumferentially of a continuously rotating drum.

In the prior art, it is well known to direct an article to a particular storage means, such as a bin or receptacle, depending on a grading, sizing or other classification of the article which is usually accomplished by a device which inspects or measures the article as it is moved past such device. Storage devices which are operated or initiated by a ticket or tag are also known; for example, automatic parking of an automobile. In the field of merchandising, articles are stored in receptacles and retrieved therefrom by punched cards which are selected by a customer, the various article cards then being utilized to retrieve and deliver the chosen article to a central or common packaging area. Generally speaking, such systems are two separate and distinct operations, that is, the storage takes place at one time and the retrieval occurs at a later time so, in effect, the operations cannot occur at the same time. Further, the known storage and retrieval devices do not lend themselves to a concurrent operation and are of such proportions that a large amount of space is required to make the system practical for a number of articles which may number in the thousands and each of which must be separately stored, recorded, and retrieved.

While the present invention is concerned with the storage and retrieval of envelopes which contain photographic prints and/or negatives, it is also applicable to many other fields which require the storage and retrieval of a similar article. The storage and retrieval device described hereinafter forms part of a system which also includes the pricing and assembling of a dealer's complete or partial order. The storage and retrieval device utilized in the system to be described hereinafter comprises a continuously rotating storage device which is capable of storing several thousand envelopes. By encoding the storage information for each envelope on a card and then preparing one or more cards for the same dealer which carries the storage information for his complete order, the envelopes can then be retrieved from the storage device for shipping as a completed order. Since the storage device is circular and provided with tiers of storage pockets, the space requirements are relatively small as compared with other known and similar storage systems. In addition, if a dealer's order is excessively large, a portion of the order can be retrieved at any time in order to provide storage space for other orders. With the use of a circular device an advantage is also obtained in that more than one loading station can be located about the device as well as more than one discharging station for the retrieved envelopes.

Other objects and advantages will be more readily apparent to those skilled in the art by the description which follows of a particular embodiment of the invention.

The primary object of the invention is, therefore, to provide a storage device for receiving articles in random order and from which all of the articles of a particular group can be retrieved in a designated order.

Another object of the invention is to provide a storage device for receiving articles in random order and from which all of the articles of a particular group can be concurrently retrieved.

Still another object of the invention is to provide a storage device comprising a rotatable drum having a number of tiers of pockets arranged about the periphery of the drum, the pockets being utilized to store individual articles whose locations on the drum are recorded on a medium which is used to retrieve the articles in a group classification.

Yet another object of the invention is to provide a storage device comprising a rotatable drum having a number of tiers of pockets arranged about the periphery of the drum, the pockets being utilized to store individual articles and which includes a photoelectric detecting device which locates the first empty pocket in any tier for receiving the articles to be stored.

A further object of the invention is to provide a storage device comprising a rotatable drum having a number of tiers of pockets arranged about the periphery of the drum and a carrier which moves the article to be stored to the proper tier and inserts it in a pocket in said tier in accordance with the first empty pocket in any tier detected by means which continuously scans the tiers of pockets.

A still further object of the invention is to provide a storage device comprising a rotatable drum having a number of tiers of pockets arranged about the periphery of the drum and means which, upon detection of the first empty pocket in any tier into which the article is to be inserted, automatically records the storage address for ultimate use in retrieving the same article.

Still another object of the invention is to provide a storage device comprising a rotatable drum having a number of tiers of pockets arranged about the periphery of the drum in which individual articles are stored and from which all the articles of a particular classification are retrieved from said pockets in response to a medium encoded with information as to the locations of the articles by tier and pocket number.

And a further object of the invention is to provide a storage device comprising a rotatable drum having a number of tiers of pockets arranged about the periphery of the drum in which the articles can be entered for storage at more than one station concurrently and also be retrieved at more than one station concurrently for directing the retrieved articles to a central area.

Reference is now made to the accompanying drawings wherein like reference numbers and characters designate like parts and wherein:

FIGS. 2 and 2A are respectively a plan view of the storage device showing the relative position of hte detection, loading and retrieval stations and a partial plan view of a retrieval station;

FIG. 3 is a partial vertical section through the storage drum showing the tiers of pockets and the arrangement for supporting the carrier mechanism;

FIGS. 4 and 5 are elevation views respectively of the means for driving the storage drum and the carrier mechanism;

FIG. 6 is a detail perspective view of one of the pockets carried by the storage drum;

FIG. 7 is a side elevation of the arrangement for detecting the empty pockets on the storage drum;

FIG. 10 is a plan view of the carrier mechanism;

FIG. 16 is a side elevation of the left-hand end of the carrier mechanism and of the envelope carrier;

FIGS. 17 and 18 are detail front and sectional views of the envelope carrier;

FIGS. 19 and 20 are respectively a plan view and a side elevation of the arrangement for supporting and counter-balancing the carrier mechanism;

FIGS. 35, 36, and 37 are schematic wiring diagrams of the circuitry for locating a storage pocket and ejecting the envelope or article stored therein.

GENERAL DESCRIPTION

Figure 1:
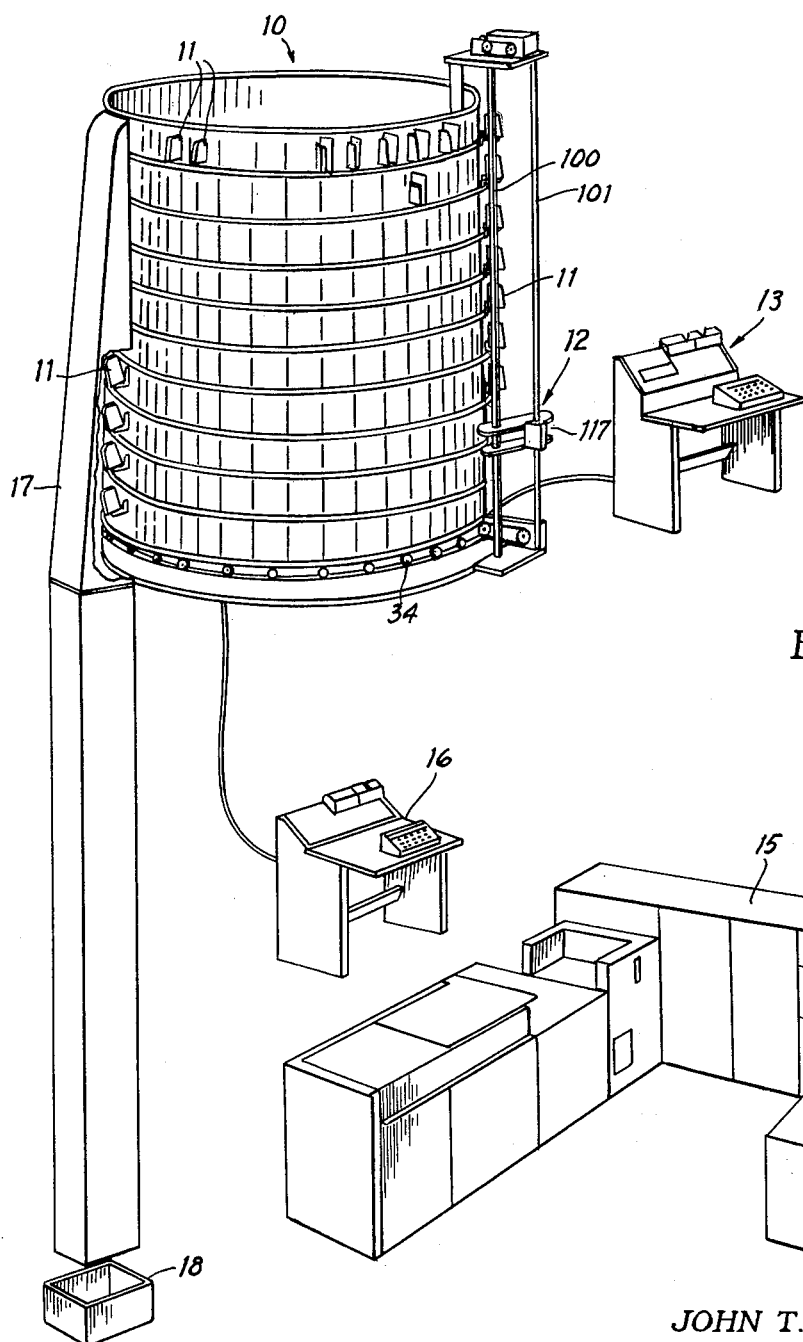
FIG. 1 is a diagrammatic representation of the storage device and various equipment used in conjunction therewith.

The embodiment of the invention to be described in detail hereinafter relates particularly to the use of a storage and retrieval device as applied to the handling of customers' orders received and then processed and shipped to a dealer who initially forwards the customer's order to the processing plant. When a customer brings one or more rolls of film to a dealer for processing and printing, each roll of film is placed in a separate envelope by the dealer. Each of these envelopes has a dealer number printed thereon which is identical in each case and this particular code number is representative of the particular dealer. In addition, each envelope bears a sequential number. The dealer accumulates a number of such orders over a period of time and then forwards this order to the processing station. Such an order will comprise anywhere from one to several hundred rolls of film which will be of different types as well as various sizes. When such an order is received at the processing station, it is segregated into the various types and sizes of film which are then directed to the proper processing station for development and printing. After processing, the negatives and the corresponding prints are assembled at a point where they are again inserted in the same envelope and in addition, the processing charge number and type of prints, charge for each type of print, any other charges as well as the total charge to the customer are added or imprinted on the envelope. Since the dealer's original order had been segregated for the purpose of processing, the separate items, after processing, will be intermingled with those of many other dealers. As a result, each completed order, as it is finally processed and charged, will be randomly arranged and included with orders from other dealers.

At this point, it then becomes necessary to segregate each dealer's order and to accumulate these orders until each dealer's complete order is finally assembled for shipment. For the purpose of storing each customer's order, the completed order, together with many others, is delivered to an operator who after recording certain information, places the envelope in a carrier which directs the envelope to a storage position on a rotatable drum. Before placing the envelope in storage, the operator key punches the dealer code number, the envelope sequential number and the various and total charges mentioned above into an IBM card. After this information has been recorded on the card, the envelope is then positioned by the operator in a carrier which initiates a machine cycle to locate the first empty pocket in the storage device for receiving and storing the envelope.

The pocket address or location in which the envelope is stored is also recorded automatically in the same card with the information entered by the operator. Once this information has been obtained and all of the envelopes delivered to the operator have been stored, the group of cards is forwarded to a central control center. At this point, each card is utilized to obtain a complete listing of the orders for each dealer. This information is accumulated for accounting purposes to ultimately produce a billing for the dealer as well as a shipping memo. The information as to the location of each customer's order by dealer is entered from the card into a storage means and at any time this information can be read out of storage and into a key punch machine for producing one or more cards which bear the location information of each order in storage for a particular dealer. Such a card is then utilized to retrieve from the storage means all of the envelopes stored therein in accordance with the information contained on this card or group of cards. The orders for a dealer are discharged at a common point and are directed to a central area where these envelopes are accumulated and checked against the shipping memo which has already been prepared from the information accumulated from the individual cards prepared by the operator at the storage device. When all of the orders have been retrieved from storage, the orders, together with the shipping memo, are then packaged and are made ready for shipment.

The system described generally hereinabove is shown in diagrammatic form in FIG. 1. In this figure of the drawing, the storage device or drum is generally indicated by the numeral 10 and comprises a number of pockets 11 arranged in a number of tiers and peripherally of the drum. To the right of drum 10, a carrier 12 is arranged for vertical movement with respect to drum 10 and the pockets 11. At this point, an IBM key punch machine designated by 13 is arranged for use by the operator to prepare the card which carries the information regarding the dealer code number, the envelope number, the processing charge, and which automatically records the location of the envelope on the drum 10. The numeral 15 designates generally the apparatus which is used for sorting the cards obtained from the operator as well as the apparatus for storing the dealer information and preparing the shipping memo. Included with this apparatus is also the card punching device which provides one or more cards with the location of the dealer's complete order. This card is then used in the card reader designated by the numeral 16 and the signals derived from the card are utilized to locate the orders stored on the drum 10 and discharge them at the point 17 into a chute which directs them to a location, designated generally by 18, at which the orders are assembled for shipment. The diagrammatic disclosure of FIG. 1 shows only a single loading station as well as a single discharge station. However, one or more loading stations can be positioned about the drum 10 and in a like manner a similar number of discharge stations can also be located about the drum. As will be apparent from the description which follows, the retrieval of orders can be taking place at the same time or concurrently with the storing of orders by the operator. In this way, a flow of envelopes actually takes place, that is, as envelopes are being positioned on the drum for storage, others are at the same time being discharged from the drum for assembling and packaging for shipment.

Figure 2A:
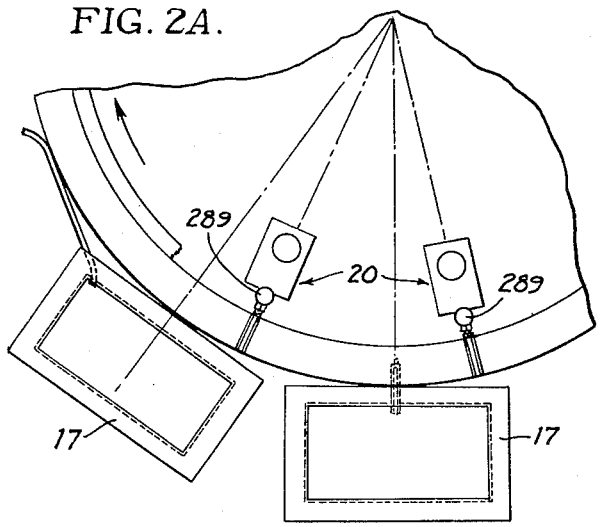

With respect to FIG. 2, it will be noted that the carrier 12 is positioned ahead of the retrieval station designated by the numeral 20; however, the retrieval station can be located at any point about drum 10 and bears no relationship to the carrier 12. Also, the means for detecting the first empty pocket into which the envelope is to be inserted is designated by the numeral 19 and since the drum is rotating in a clockwise direction, the detecting means 19 is and must be arranged ahead of the carrier or loading station 12. With this arrangement, at the time the envelope is inserted in the carrier by the operator, a cycle of operation is effected which comprises first locating the empty pocket in any tier in which the envelope is to be inserted and then moving the carrier from a home position either up or down with respect to the drum to the proper tier so that by the time the designated pocket is opposite the carrier 12 the envelope will be in proper position for insertion into the pocket.

DRUM ASSEMBLY

Figure 4:
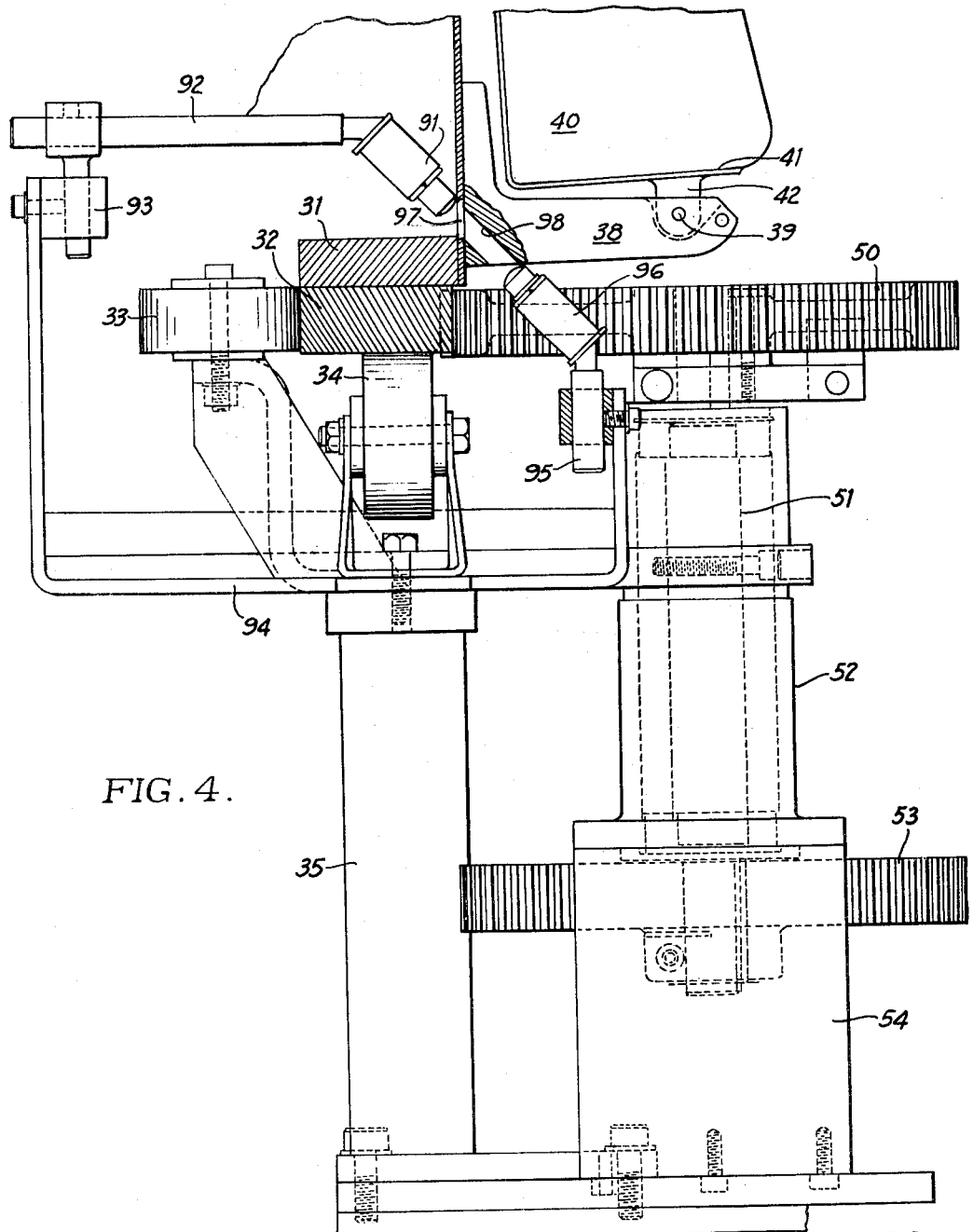

With particular reference to FIGS. 2–5 the drum 10 comprises a hollow vertical sleeve 30 which is welded or otherwise secured together to provide a vertical cylinder. For the purpose of illustration, the sleeve 30 is of the order of 7 feet in diameter and approximately 8 feet in height. At the bottom of the sleeve 30, a cylindrical ring 31 is secured to the sleeve in any suitable manner, such as by welding. The ring, in turn, carries a spur gear 32 which is welded or secured to the ring. In this form, the drum 10 is supported by rollers 33 and 34 which are mounted on a pedestal 35, as shown in FIG. 4. The roller 33 supports the drum internally of ring gear 32 whereas roller 34 supports the drum vertically. It is to be understood, of course, that a plurality of such rollers are spaced about the drum 10 and permit rotary motion thereof by this means of mounting. As shown in FIGS. 2 and 5, a motor 36 is arranged below and to the outside of drum 10 and carries a gear 37 which meshes with the ring gear 32 on the bottom of drum 10. The motor 36 is continuously driven and due to the gear drive comprising gears 37 and 32, the drum is continuously rotated on the sets of rollers 33 and 34. With reference now to FIGS. 3 and 4, a plurality of brackets 38 are equally spaced in a vertical direction on the outer periphery of sleeve 30. In addition to the vertical arrangement of brackets 38, the brackets are also spaced radially about the periphery of sleeve 30. In the present embodiment, by way of example, there are 300 brackets arranged about the periphery of sleeve 30 and 10 tiers of such brackets vertically of the sleeve. Pivotally mounted at the forward end of each bracket at the point 39, a pocket 40 lays against the side of the sleeve 30 and is provided with an open front and top. A detail view of such a pocket is shown in FIG. 6. Since the drum 10 has ten tiers and each tier has 300 pockets, the drum has a capacity for receiving 3000 envelopes or similar articles. Each of pockets 40 as shown in FIG. 6 comprises a separate unit which is preferably molded from plastic so as to be light in weight. As mentioned above, the top and front end of a pocket is open to permit insertion of the envelope. The lower surface 41 of the pocket carries an extension 42 which pivotally engages the respective bracket 38. At the top of the rear wall 43 of each pocket, a projection 44 is provided which at its outer edge is provided with a number of serrations or grooves 45 for a purpose to be described hereinafter. Due to the position of extension 42 and the projection 44 at the top and rear of the pocket, the center of gravity is such that the pocket tends to lie against the sleeve 30 in its normal position during rotation of the drum.

With reference to FIGS. 2 and 4, it will be noted that the gear 32 also meshes with a gear 50 which is carried by the shaft 51. Shaft 51 is journaled in the bearing block designated by the numeral 52 and at its opposite end has a gear 53 keyed thereto. The bearing block 52 is carried by a supporting bracket 54, as shown in FIG. 4. As shown in FIG. 2, gear 53 meshes with an idler gear 55 which, in turn, meshes with a gear 56 associated with the drive for the carrier means to be described hereinafter.

The empty pocket detecting means, designated by 19 in FIG. 2, comprises a vertical post 60 as shown in FIG. 7, which is arranged parallel to the drum 10 and spaced from the periphery to clear the pockets and any envelopes which can extend beyond the pockets. This relationship is disclosed in FIG. 7. The post has a split bracket 61 fixed thereto and this bracket carries a light tube 62 and a support rod 63 for a photoelectric detector 64. At the end of light tube 62, a mirror 65 is mounted at an angle to reflect a beam of light upward through end of a pocket to the detector which is carried by the support rod 63 above the pocket. If the pocket is empty, the light beam will of course be reflected directly through the pocket to the photo detector 64 located above the particular pocket. On the other hand if an envelope is carried by the pocket, it will tend to lie diagonally across the pocket or if the envelope contains a relatively large number of prints and negatives will be of such a thickness that it will fill the width of the pocket. In either of these cases, the light beam reflected by the mirror 65 will not be able to pass therethrough to the detector 64. As is well-known with respect to photo detectors, an electrical signal is derived when the detector passes from a light source to a dark source and this will occur, of course, with an envelope in a pocket. This signal is then utilized to indicate that the pocket is full. The manner in which such a signal is utilized to control the detection of the first empty pocket in any tier will be apparent from the description hereinafter relating to the electrical circuitry. It is to be understood that ten such detecting means mus be arranged along the post 60 with a mirror 65 and a detector 64 being associated with each tier of pockets. In place of a hollow tube at the end of bracket 61 for supporting mirror 65, a piece of Lucite can be inserted in the end of the tube 62 and beveled at the end at the proper angle and then silvered to provide a reflecting surface equivalent to that of the mirror 65. This use of a Lucite rod as a light conveying means is well known in the optical field. Each of tubes 62 is provided with a lamp 66 and a suitable lens or lens system 67, as indicated in FIG. 7. In order to eliminate the possibility of any vibration of mirror 65, the end of light tube 62 is supported at the end by the adjustable arm 68 which is secured to post 60. By the arrangement just described, it is evident that an empty pocket 40 in any tier can be detected and when more than one such pocket is detected, the pocket selected is the one which is nearest the carrier means when it is in its normal or home position. This will become more evident in connection with the description of the electrical circuitry which follows hereafter.

Figure 8:
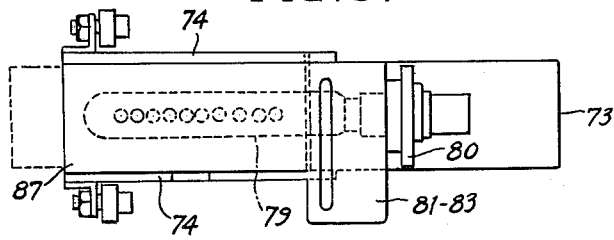
FIGS. 8 and 9 are a plan view and a side elevation of the code reading means arranged within the storage device.
Figure 9:
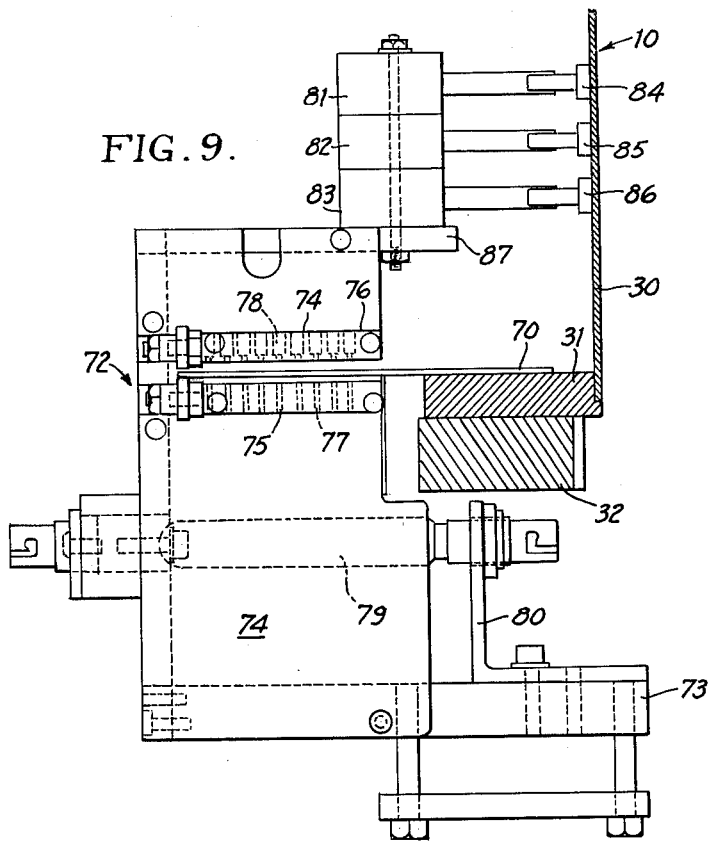
Figure 14:
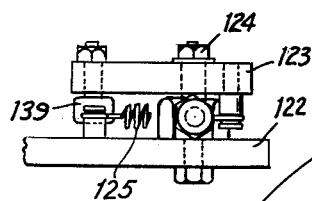
FIGS. 13 and 14 are respectively side elevation views of the drive release mechanism taken in the directions A—A and B—B in FIG. 11.

In addition to determining the tier in which an empty pocket appears, it is also necessary to record the number of such pocket in this tier. This is accomplished by a code ring mounted within the drum 10 and shown specifically in FIGS. 8 and 9. In order to eliminate encoding 1, 2, and 3 digit numbers to cover the number range from 0 to 299, the numbers are divided into three groups 0–99, and each group is determined by successively actuating the three microswitches arranged within the drum 10. The code ring 70 is mounted within drum and is secured to ring 31 as shown in FIG. 9. Ring 70 is provided with radially arranged perforations aligned with each of the pockets arranged radially about the circumference of sleeve 30. These perforations or holes are in accordance with a code system to designate the number of each pocket. In the present instance, a 1, 2, 4, 7 code is utilized which always requires two perforations to indicate any one of the digits 0–9, a 0 being indicated by the 4, 7 combination and for each character 1, 2, 4, or 7, which requires only a single perforation, an additional perforation is included to provide a parity check. As shown in FIG. 8, ten detectors are mounted radially as described hereinafter to obtain the necessary count of 0–99. The first five detectors are utilized to indicate the tens digit, whereas the other five detectors are utilized to indicate the units digit. In each group of five detectors, the first detector is used as a parity check, that is, for each of the characters 1, 2, 4 or 7, the detectors in each group indicating the tens and units digit to obtain the full range of numbers 0–99. The code-reading device, generally indicated by the numeral 72, comprises a plate 73 which is mounted on a suitable mounting plate which is arranged within the drum 10 and carries two vertical plates 74 between which a perforated plate 75 and a detector supporting plate 76 are mounted. The perforations in plate 75 are aligned with the possible code positions in the ring 70 and the detectors 78 are mounted in plate 74 in alignement with the perforations in plate 75. Between plate 73 and the perforated plate 75, a lamp 79 is supported by bracket 80 for providing a source of illumination for the photo detectors 78. A plate 87 is secured between plates 74 at the top thereof and furnishes a support for three microswitches 81, 82, and 83. As pointed out above, the 300 pockets are divided into three groups 0–99 and each of microswitches 81–83 is associated with one of these groups. The sleeve 30 of drum 10 carries three sector rings 84, 85, and 86 which are mounted on the inside surface of the sleeve 30 and offset with respect to each other to actuate their respective switches 81, 82, and 83, in accordance with the group of pockets being scanned by the detectors 78. For example, with one revolution of drum 10, 300 pockets pass by any fixed point in this one revolution. As a result, at the start of such a revolution the microswitch 81 will be closed by its respective actuating sector 84 and will be held closed until the 100th pocket has passed the fixed point. At this point, the switch 81 will open and the operating or actuating sector 85 will then close the microswitch 82 for a period determined by the next 100 pockets to pass the fixed point. Again, at this point, the switch 82 will open and the operating sector 86 will close its microswitch 83 during the movement of the next 100 pockets to complete this one revolution of drum 10.

With particular reference to FIG. 2, the code reading device 72 described hereinabove is utilized at several different positions within the drum 10 for reading the code ring 70. This is generally indicated in FIG. 2 wherein the reading device 72 is used ahead of the loading station 12 for providing the address of the empty pocket detected in the loading station itself to perform a check on the pocket location into which the envelope is inserted, and at the retrieval station 20 for reading the code ring to determine the pocket number as they are moved past the ejection station 20. The actual performance of these code reading devices will become more apparent when their function is described in conjunction with the electrical circuitry. It should be pointed out that the same reading device 72 would also be used in conjunction with the necessary pocket detection, loading and retrieval positions of a second group of such stations which are diagrammatically indicated in FIG. 2.

Immediately beyond the loading station 12, as shown in FIG. 2, the numeral 90 designates a group of three photo detectors which derive signals from light transmitted through a series of holes in the sleeve 30 and each of the brackets 38 for supporting the pockets 40 which are attached to the sleeve 30. The actual arrangement of this photo detector system is shown in detail in FIG. 4. The three detectors 91 are each supported by a rod 92 which is caried by a mounting bracket 93 secured to a U-shaped bracket 94. The bracket 94 is mounted on the supporting structure 35 for the drum 30, as shown in FIG. 4, and at the other end carries a mounting bracket 95 on which a light source 96 is mounted. The photo detector 91 and its associated light source 96 is aligned to detect the presence of the hole 97 in the sleeve 30 and the hole 98 in the bracket 38. With the detection of each such hole as the drum is continuously rotating, a signal is derived from each of the detectors 91. The photo detectors 91 are spaced from each other in accordance with a predetermined spacing to provide the necessary operating sequence. The signal derived from the photo detector 91–1 is utilized to advance a counter; the signal derived from the photo detector 91–2 is utilized to sequentially actuate a gating circuit; and the signal derived from the photo detector 91–3 provides a gating pulse for the carrier or loader mechanism 12, as will be described in more detail in connection with the electrical circuitry.

CARRIER MECHANISM

As described hereinabove with respect to drum 10, it is evident that the envelope to be placed in storage must be moved into a position with respect to the tier having the first empty pocket for receiving the envelope. This is accomplished by a carrier mechanism which moves vertically, moves an envelope chute at the same time in a horizontal plane from a loading position to a position adjacent to the proper pocket on drum 10 and, at this point, inserts the envelope into the pocket. As shown in FIGS. 1 and 2, the carrier mechanism, designated generally by the numeral 12, is arranged alongside of drum 10 and spaced therefrom. Vertical movement of the carrier mechanism is accomplished by movement along two vertical and spaced shafts 100 and 101, the shaft 100 being of square cross-section and the shaft 101 being circular. The normal or home position of the carrier mechanism is at a level equivalent to the second tier on the drum. This position is arbitrarily chosen inasmuch as it is at a convenient height for the operator. At this level any pocket which is detected in the second tier for storage of an envelope does not necessitate any movement of the carrier in a vertical position but only movement of the envelope carrier to a position adjacent to the drum 10. If a pocket is detected for storage in the first tier, the carrier must then move vertically downward and then return to its home position at a level with the second tier. For any other pocket in the tiers 3–10, the carrier will have to move vertically upward and then return to its normal position for loading of another envelope at a level with the second tier. It should be apparent therefore that the size of drum 10 and the number of tiers provided for storage will determine the proper and most convenient level for the carrier mechanism to be in the most efficient operating position. It is conceivable that an element of time can be advantageously accomplished by positioning the carrier mechanism at the centermost tier, thereby providing a minimum amount of travel for the maximum position.

The vertical shafts 100 and 101 are suitably mounted at the bottom of drum 10 and also at the top of the drum in any suitable manner to properly position these rods parallel to the periphery of the drum and in proper spaced relation thereto in accordance with the carrier mechanism structure.

Figure 15:
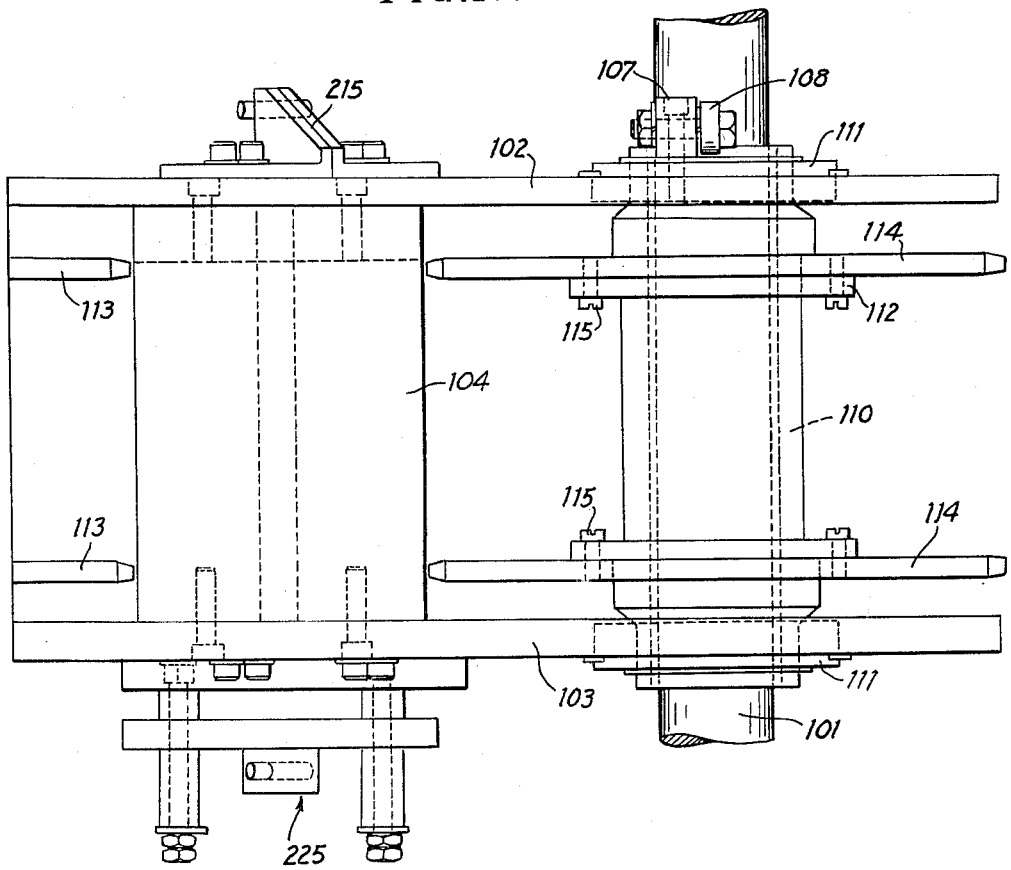
FIG. 15 is a side elevation of the right-hand end of the carrier mechanism.

The carrier mechanism comprises two spaced plates 102 and 103 which are maintained in this spaced relation by a H-shaped bar structure 104 as shown in FIG. 10. The shafts 100 and 101 pass through these plates and, with respect to each of shafts 100 and 101, as shown in FIGS. 10 and 16, it will be noted that the shafts pass through sleeves 109 and 110. Sleeve 109 carries a bracket 105 which, in turn, carries rotatably mounted rollers 106. The rollers are arranged with respect to bracket 105 so as to engage diagonally opposite sides of the shaft 100. As shown in FIGS. 10 and 15, the sleeve 110 also carries a set of brackets 107 which, in turn, carry the rollers 108 which are arranged diametrically opposite each other to engage the shaft 101. The rollers 106 and 108 serve to guide the carrier mechanism in its vertical movement in either an up or a down direction. Each of sleeves 109 and 110 is journaled in bearings 111 mounted in plates 102 and 103 and is provided with flanges 112 to which sprockets 113 and 114 are secured such as by screws 115. Both pairs of sprockets are interconnected by a chain member 116 and the envelope carrier, designated generally by the numeral 117, is secured to the chain as shown in FIG. 16 at the points 118. A strip cam 119 is arranged between plates 102 and 103 and is of a shape best shown in FIG. 10. This cam is mounted on the H-bar 104 and provides the means in conjunction with the envelope carrier 117 for inserting the envelope into the proper pocket 40 on the drum 10.

Figure 11:
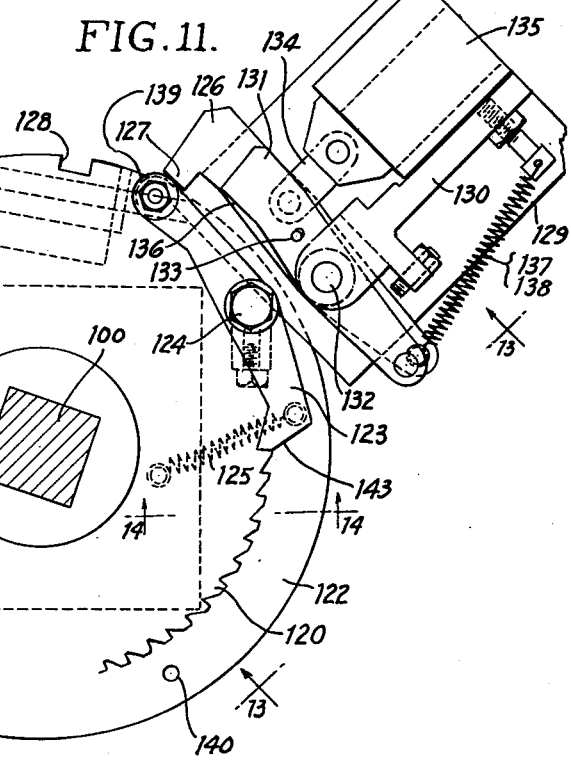
FIGS. 11 and 12 are respectively a plan view of the drive release mechanism and a side elevation of the drive mechanism.

The means for driving the envelope carrier 117 from the load position to a position opposite the pocket for receiving the envelope and then returning the envelope carrier to its initial load position is derived from the gear 32 on the bottom of the drum 10, as described hereinabove. This drive includes the gear 50, the gear 53, the idler gear 55, and the gear 56. With respect to FIGS. 11–14, the gear 56 is freely rotatable on the cylindrical end of the square shaft 100 and carries therewith a ratchet 120 which is fixed to the gear by the screws 121. Immediately below ratchet 120, a stop disc 122 is also arranged on shaft 100 and is keyed thereto for rotating said shaft. Since gear 56 and ratchet 121 are rotatable as a unit and are freely rotatably on the end of shaft 100, the motion imparted to gear 56 by the rotation of drum 30 has no effect on the shaft 100. In order to provide a driving connection between the ratchet 120 and the shaft 100 to thereby rotate said shaft, a pawl arrangement, such as disclosed in FIG. 11, is utilized to connect ratchet 120 to the stop disc 122. The stop disc 122 carries a pawl 123 which is pivotally mounted on the stud 124 near the peripheral edge of said disc. The nose 143 of pawl 123 is urged toward the teeth of ratchet 120 by the spring 125 which is also secured to the stop disc 122. In a normal or non-driving relation, the stop disc 122 is engaged by a stop link 126 whose nose 127 normally engages the slot 128 in the peripheral edge of disc 122. A bracket 129 is mounted adjacent the peripheral edge of disc 122 and carries a bracket 130 on which the stop link 126 and a cam 131 are pivotally mounted with respect to the pin 132 carried by the bracket 130. The stop link 126 and the cam 131 are interconnected by a pin and slot connection designated by the numeral 133, the stop link being connected intermediate its nose 127 and the pin 132 by a link 134 to the armature of the solenoid 135. The end 136 of cam 131 as well as the nose 127 of stop link 126 are urged toward the disc 122 in a counterclockwise direction with respect to pin 132 by the springs 137 and 138 connected to the respective ends of these members. In the normal non-driving relationship, the nose 127 will be in engagement with the slot 128 and the follower 139 on the end of pawl 123 will be in engagement with the end 136 of cam 131 so that the disc 122 is held against rotation and the pawl 123 is held out of engagement with the ratchet 120. When in this relation, the gear 56 and ratchet 120 are free to rotate without imparting any rotation to the shaft 100. However, upon energization of solenoid 135, the stop link 126 is moved thereby in a clockwise direction to remove its nose 127 from the slot 128 and, due to the pin and slot connection 133 between the stop link 126 and the cam 131, the cam is also moved in a clockwise direction to permit the spring 125 to move the pawl into engagement with ratchet 120. The various parts thereby assume the positions shown in FIG. 11 and the ratchet 120 through the pawl 123 and its connection to the disc 122 therefore rotates disc 122 and since it is keyed to shaft 100 imparts rotation to this shaft.

Figure 12:
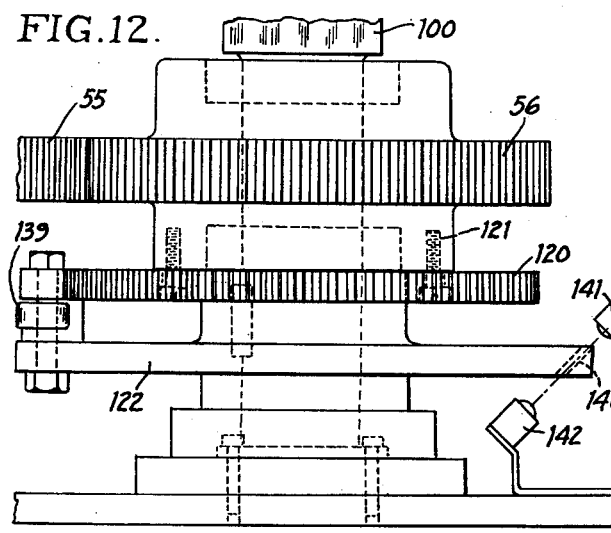
Figure 13:
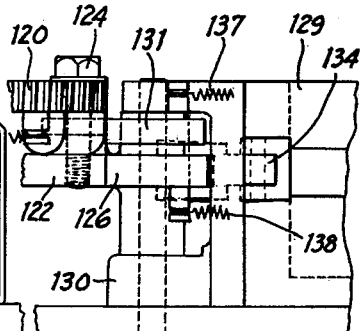

Since the sprockets 113 are connected to the sleeve 109 which is secured to shaft 100, these sprockets are rotated therewith and drive the chains 116 which carry the envelope carrier 117 therewith. The drive ratio between the ring gear 32 of drum 10 and the gear 56 which drives shaft 100 is such that shaft 100 makes two complete revolutions to move the envelope carrier 117 from the load position around the shaft 101 into position with respect to the drum 10 and around shaft 100 and back to the load position. As shown in FIG. 12, the stop disc 122 is provided with an angular arranged hole 140 which is scanned by a detector 141 provided with a light source 142 for establishing proper position of the disc 122 with respect to the holding device comprising stop link 126 and cam 131. The signal derived from the detector 141 with each revolution of disc 122 will be described more fully hereinafter in connection with the description of the electrical circuitry.

ENVELOPE CARRIER

The envelope carrier 117 comprises two spaced plates 150 and 151, the configuration of these plates being shown best in FIG. 17. The plates are retained in spaced relation by a block 152 and a block 153 which are secured between the plates at the right-hand end, as shown in FIG. 16. Three plates 154, 155, and 156 are arranged between plates 150 and 151 at the bottom thereof to also retain these plates in proper spaced relation. Both of plates 150 and 151 are provided with guide portions 157 which are formed outwardly as shown in FIG. 17 for receiving the slide member 158. The slide member 158 is T-shaped having the portions at the top engaging the guide portions 157 and the tail portion extending between plates 150 and 151 and being secured at the forward end to a vertical plate 159 by the screws 160. The upper portion of plate 159 is provided with an extension 161 which moves through a formation 162 in the plate 150. The right-hand end of slide member 158, as viewed in FIG. 16, is bifurcated and carries a roller 163 which engages the strip cam 119 for a purpose to be described hereinafter. Immediately below roller 163 the slide member 158 also carries a plate 164 on which a roller 165 is rotatably mounted.

The envelope carrier 117 is secured to the chains 116 which encircle the sprockets 113 and 114 by right-angle brackets 166 which are carried by blocks 152 and 153. Block 152 supports a freely rotatably roller 167 and block 153 supports two spaced and freely rotatable rollers 167, the rollers engaging the edges of the plates 102 and 103, as shown in FIG. 16. Block 153 carries a freely rotatable roller 168 which engages the upper surface of the plate 103. In order to maintain the envelope carrier 117 in a relatively fixed position with respect to chain 116, springs 169 are secured to plates 150 and 151 and to extensions on the upper bracket 166, as shown in FIG. 10. A third spring 170 is secured to plate 156 by screw 171 and has its other end anchored to one of the lower brackets 166, as shown in FIG. 16. The plate 151 carries a block 172 on which the arms 173 and 174 are pivotally mounted at 175. These are spring biased toward each other and at the end of each arm an envelope engaging member 176 and 177 is, respectively, mounted. The members are movable through openings in the plate 151 and engage the envelope to hold the envelope against the plate 150. The shape of members 176 and 177 is such as to permit the envelope to be easily inserted by the operator from the top of carrier 117, thereby moving said members about their pivot so that upon release of the envelope by the operator the envelope is moved and held against plate 150. Member 178 is pivotally mounted between plates 150 and 151 at 179 by the pin 180. This member is provided with an inclined surface 181 which extends into the open portion of the pocket formed by the plates 150 and 151 for engagement by the bottom of the envelope. Member 178 is retained in an adjusted position by the stop screw 182 and at the bottom surface 183 carries a mirror 184. The mirror 184 is utilized to normally reflect a beam of light from the source 185 to a photoelectric detector 186 and, as will be apparent from the description of the electrical circuitry, the detector 186 will emit a signal only when this light path is disrupted or broken. Light source 185, mirror 186 are utilized as the means for initiating the movement of the carrier mechanism. When an envelope is inserted between plates 150 and 151 by the operator and moved vertically downward against the plate 154 and 155, the member 178 will be pivoted about pin 180 by the bottom of the envelope and the beam of light to detector 186 will be broken. When this occurs, the detector 186 will provide a signal for initiating the location of the first empty pocket in any one or more of the tiers by the detecting means 19.

As shown in FIG. 16 the slide number 158 is normally held in a position to the right by the spring 187 which is arranged between plates 150 and 151 and has one end secured to the screw 188 carried by plate 159 and the other end secured to a pin 189 arranged between the ends of plates 150 and 151. On the outer surface of plate 150, a lever 190 is pivotally mounted on the stud 191 and carries a formed plate 192 which is guided by the member 193. The other extremity of lever 190 comprises an arm 194 which carries a link 195 pivotally connected to said arm and to the end of the cam lever 196. The lever 196 is pivotally mounted on the stud 197 which is secured to plate 150 and has an arm 198 which is provided with a cam surface 199. Due to the spring 200 which has one end secured to lever 190 and the other end secured to a pin 201 carried by plate 150, the lever 190 is maintained in a position to the right so the cam surface 199 is arranged in the path of roller 165, and the purpose of this linkage system will become apparent from the description which follows.

As shown in FIG. 10, the arrow 202 indicates the normal home position of the envelope carrier 117 in relation to the shafts 100 and 101 for receiving an envelope positioned therein by the operator. When an envelope is positioned by the operator between plates 150 and 151, the bottom of the envelope engages the inclined surface 181 causing the member 178 to pivot about the pin 180 and thereby move the mirror 184 so as to deflect the light beam away from the detector 186. When this occurs, a signal is derived as will be more fully described hereinafter to initiate a location of the first empty pocket in any one of the tiers by the detecting means 19. As shaft 100 rotates, the sprockets 113 rotate therewith and through the medium of chains 116 the sprockets 114 are rotated on the shaft 101. Since the envelope carrier 117 is connected to and carried by the chains 116, the envelope is moved therewith to the right, around the sprockets 114 and toward the strip cam 119. When the envelope carrier 117 is moved into the straight portion of its travel between and on either side of sprockets 113 and 114, the pair of lower rollers 167 engage the edge of plate 103 and are held thereagainst by track 145 to prevent any tilting or twisting of the envelope carrier. As the envelope carrier 117 approaches the drum 10, the roller 163 engages the cam 119 and the slide member 158 is moved outward against the action of spring 187 so that the plate 159 engages the envelope and moves it outwardly toward the pocket on the drum which is to receive the envelope. With the movement of the slide member 158 toward the drum for moving the envelope, the roller 165 engages the cam surface 199 to rock the lever 196 about its pivot in a clockwise direction thereby moving the lever 190 in a counter clockwise direction to move the formed plate 192 toward the drum. The purpose of the movement of plate 192 toward the drum is to provide a means for deflecting the flap of the envelope toward the envelope so the flap will not prevent injection of the envelope into the pocket on the drum and is inserted into the pocket with the envelope. Since the envelope carrier 117 is moving toward and in the same direction as the drum 10, the ejection of the envelope from the carrier 117 commences before the pocket 40 and the envelope are completely aligned. Due to the shape of drum 10, the envelope starts to enter the pocket as the pocket and carrier approach alignment, and at this time, the envelope is completely inserted in the pocket. After the envelope has been completely inserted in a pocket on the drum, the carrier continues to be moved to the left and the slide member 158 is not completely retracted until the roller 163 leaves cam 119, see FIG. 10. The carrier 117 is moved around sprocket 113 and then comes to rest at the load position for accepting another envelope. The movement described thus far assumed that there is no vertical movement of the carrier mechanism along the shafts 100 and 101. The timing, however, is such that as the carrier 117 starts its movement toward the sprockets 114, the entire mechanism is either elevated or lowered depending on the location of the first empty pocket which is detected. However, the vertical movement of the carrier mechanism from its normal home position to the maximum vertical position wherein it is aligned with the 10th tier of pockets is accomplished by the time the roller 163 first engages the strip cam 119. As a result, it can be readily appreciated that for any other level the tier is reached before this event occurs due to the lesser time required for the mechanism to be raised to one of tiers other than the 10th tier or to be lowered to the first tier.

With reference to FIGS. 2 and 19–22, the mechanism for elevating or lowering the carrier mechanism described above is shown in detail. A hollow cylindrical post 205 is mounted within drum 10 in a position relative thereto as shown particularly in FIG. 2. This post supports a counter weight 206 and also provides the support for the upper ends of shafts 100 and 101.

Figure 21:
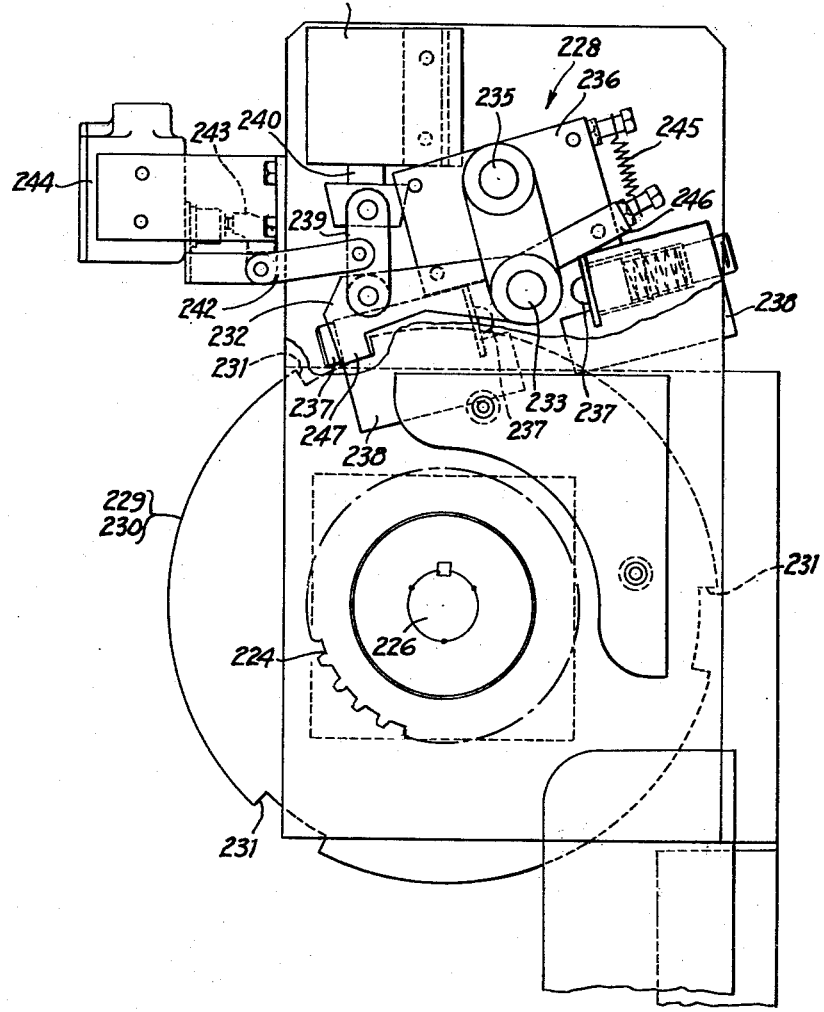
FIGS. 21 and 22 are respectively a plan view and a side elevation of the release and drive mechanism for the carrier mechanism.
Figure 22:
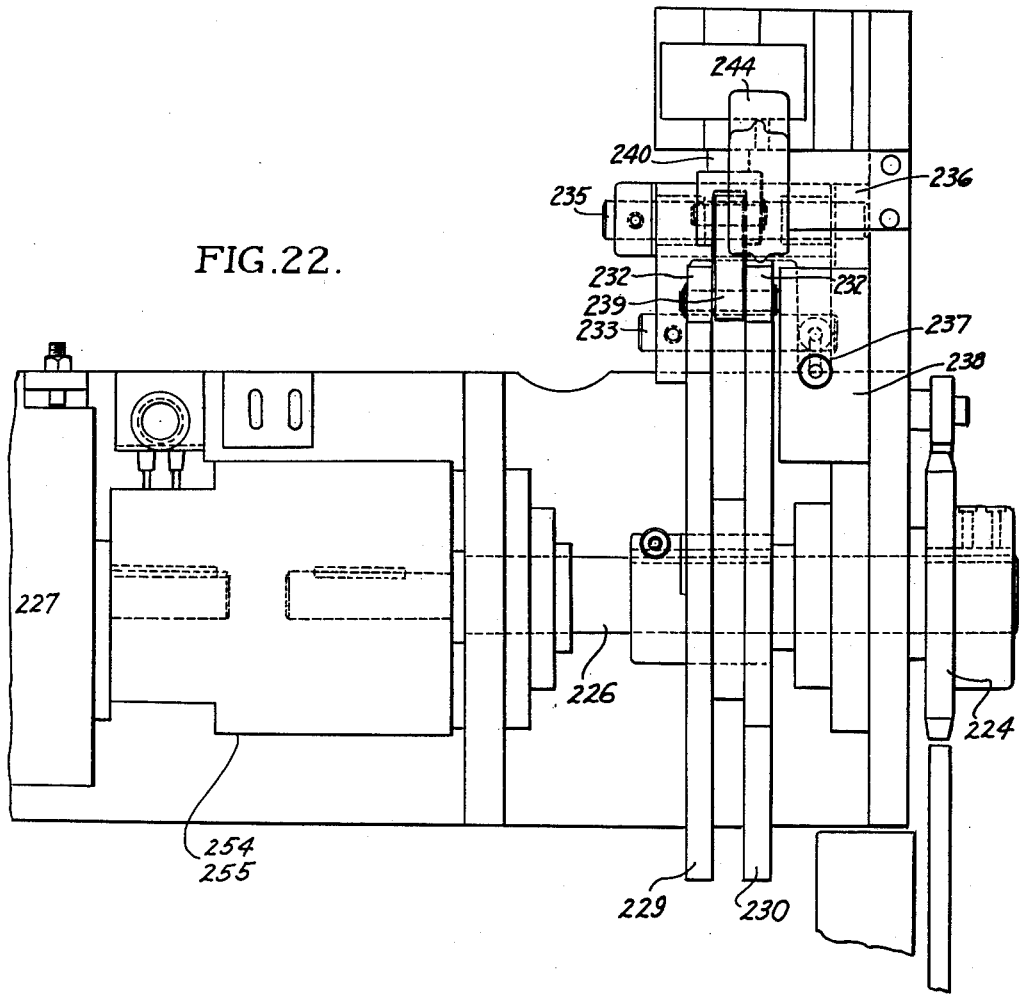

A horizontal channel 208 is secured to a plate 207 which is welded or otherwise suitably secured to the upper end of post 205. The channel 208 at its outer extremity carries a channel 209 which is arranged at an angle thereto for providing a bearing for the upper ends of shafts 100 and 101. In addition, bearing blocks 210 are secured to the underside of channel 208 to provide a support for the sprocket 211 which is freely rotatable between said bearing blocks. At a point to the left of the center of post 205, bearing blocks 212 support a sprocket 213 therebetween and a chain 214 has one end thereof fixed to the bracket 215 on the upper plate 102 of the carrier mechanism 117 and passes over the sprocket 211 and the sprocket 213 with the other end secured to the counter weight 206. As shown in FIG. 19, two counter weights 206 are utilized, one being arranged on each side of the chain 214 and being interconnected to said chain so as to be moved as a unit. The counter weights 206 are guided within a framework 216 which is mounted and secured to the post 205. The plate 217, which interconnects the two counter weights 206, extends beyond the counter weights on one side and carries a cam plate 218 which engages the micro-switches 219 which are spaced vertically along the framework 216 in accordance with the location of the tiers of pockets on the drums. The purpose of these switches will be described more fully hereinafter in connection with the description of the electrical circuitry. A chain 220 is also secured to the counter weights 206 and extends downwardly through the framework 216 and encircles a sprocket 221 located below the plate 222 on which the post 205 is mounted, the bearing blocks 223 for sprocket 221 being mounted on the underside of said plate. The chain 220 also encircles a sprocket 224 and has the other end thereof secured to the plate structure 225 on the underside of the plate 103 of the carrier mechanism 117, as shown in FIG. 15. The sprocket 224 is keyed to a shaft 226 which is driven by a reversible motor 227, shown more completely in FIG. 22. The motor 227 is connected through a clutch and an electrical brake, which are commercially available items and only illustrated diagrammatically in FIG. 22. The mechanism for releasing the drive from motor 227 for rotating shaft 226 and hence sprocket 224 is shown in detail in FIG. 21. This release mechanism, designated broadly by the numeral 228, comprises two spaced discs 229 and 230 keyed to the shaft 226, each of which is provided with three slots 231 as shown in FIG. 21. The shaft 226 is normally held against rotation by a pair of spaced pawls 232 which are pivotally mounted at 233 on the bracket 234. The bracket 234 is pivotally mounted with respect to the pin 235 carried by the bracket 236. An adjustable shock absorber 237 is carried by a block 238 on each side of bracket 234. By this arrangement, the inertia of the pawls 232 is absorbed as the noses 247 engage slots 231 to arrest movement of the discs 229 and 230. The shock absorbers 237 are biased toward bracket 234 and, hence, maintain and return bracket 234 and pawls 232 to a normal position. The pawls 232 are connected by a common link 239 to the armature 240 of a solenoid 241. The link 239 is, in turn, connected by a link 242 to a lever for actuating the micro-switch 244. The pawls 232 are normally urged into the slots 231 by the spring 245 which is connected to an extension 246 of the pawls.

When the solenoid 241 is energized, the armature 240 moves inward and through the link 239 withdraws the nose 247 of the pawls 232 out of the slots 231 with which they are engaged. At the same time, this movement of link 239 causes the micro-switch 244 to be actuated. With the energization of solenoid 241 and release of the discs 229 and 230, the shaft 226 is driven in the direction determined by the motor 227. With the rotation of shaft 226, sprocket 224 is driven in the corresponding direction and hence moves the chain 220 in the proper direction to either lower or raise the carrier mechanism 117 to the proper tier. If the carrier mechanism is to be elevated or lowered, the solenoid 241 will be maintained in an energized position so that the pawls 232 are withheld until the proper micro-switch 219 has been actuated by the cam plate 218 as the counter weight 206 moves downward. The switches 219, therefore, control the energization of the motor 227 and the braking mechanism associated therewith and are, of course, in reverse relationship to the location of the tiers of pockets. In other words, the micro-switch 219 which controls movement of the carrier mechanism to the first tier, that is, at the lowermost position of the carrier mechanism 117, will be the uppermost switch in that the counter weight will then be in this uppermost position. When the carrier mechanism 117 has been located with respect to the proper tier of pockets and the envelope inserted in the proper pocket, the direction of rotation of motor 227 is then reversed in order to move the carrier mechanism back to its initial or home position with respect to the second tier of pockets. Sprocket 224 is therefore the only driven member in the group comprising sprocket 211, 213, chain 214, chain 220, and sprocket 221. The manner in which the movement of the carrier mechanism is controlled for proper registry with each tier of pockets as well as the reversal in the cycle of operation of the motor 227 will be more completely described in the description of the electrical circuitry and a complete cycle of operation which follows.

ELECTRICAL CIRCUITRY

Cycle of Operation for Storage

Figure 23:
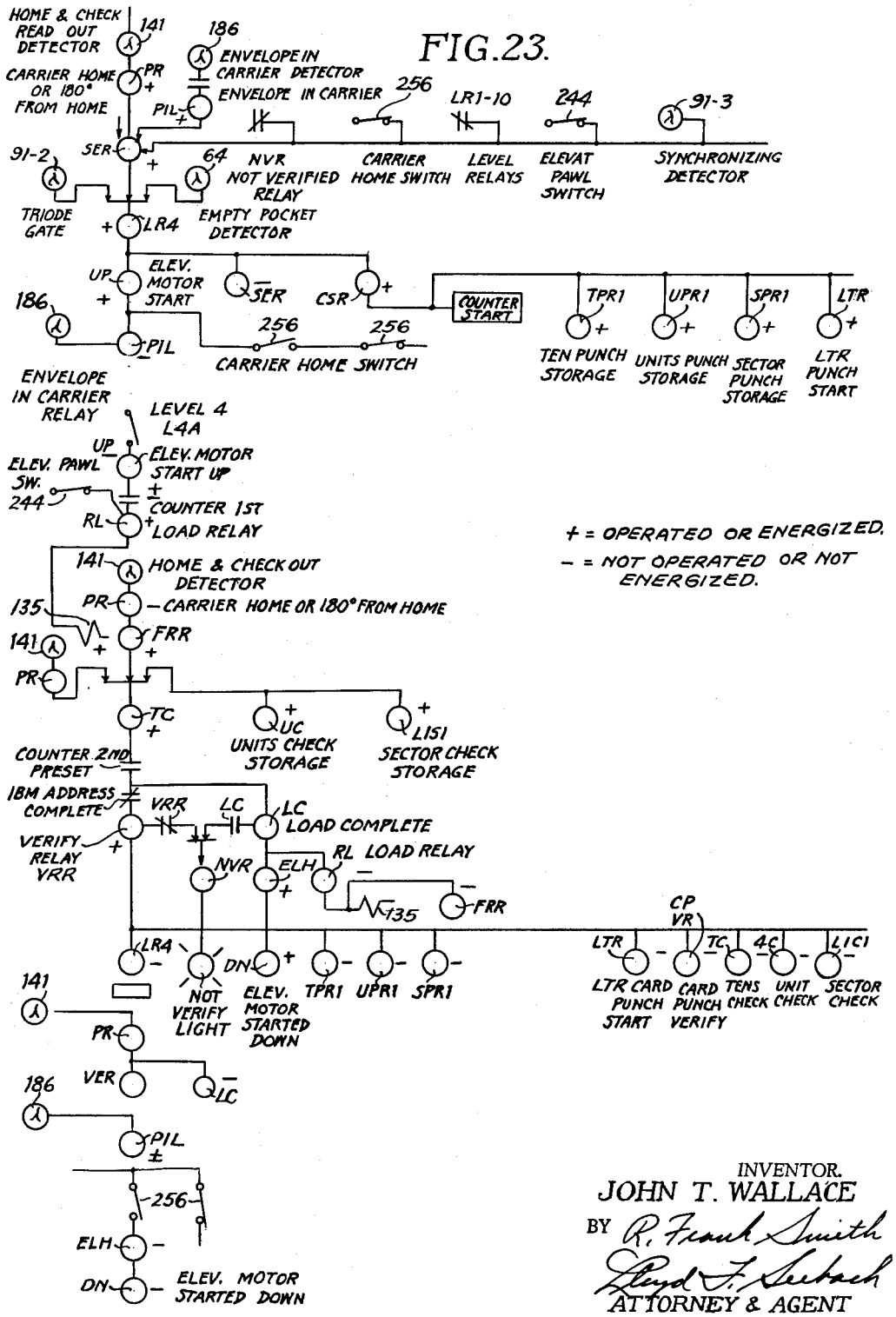
FIG. 23 is a diagrammatic sequence chart of the relay operation for a cycle of operation.

When the envelope carrier 117 is in its home or load position designated by the numeral 202 in FIG. 10 and as indicated in FIG. 2, the pawl 123 will be out of engagement with the ratchet 120 and the shaft 100 will therefore not be rotating. In this position, the pawl 126 will be in engagement with the notch 128 in disk 122 and the stop link 232 will be in engagement with one of the slots 231 in the spaced disks 229 and 230 thereby preventing any rotation of the sprocket 224 to move the carrier in a vertical direction. Further, the contacts of the micro-switch 244 which contains both an A contact and a B contact will be in the positions shown in FIGS. 27 and 30. These conditions are shown diagrammatically in FIG. 23 together with the detectors 141 and 186. At this time the detector 141 will be receiving light from its source 142 through the aperture 140 in the disk 122 due to the fact that the disk is stationary.

Figure 30:
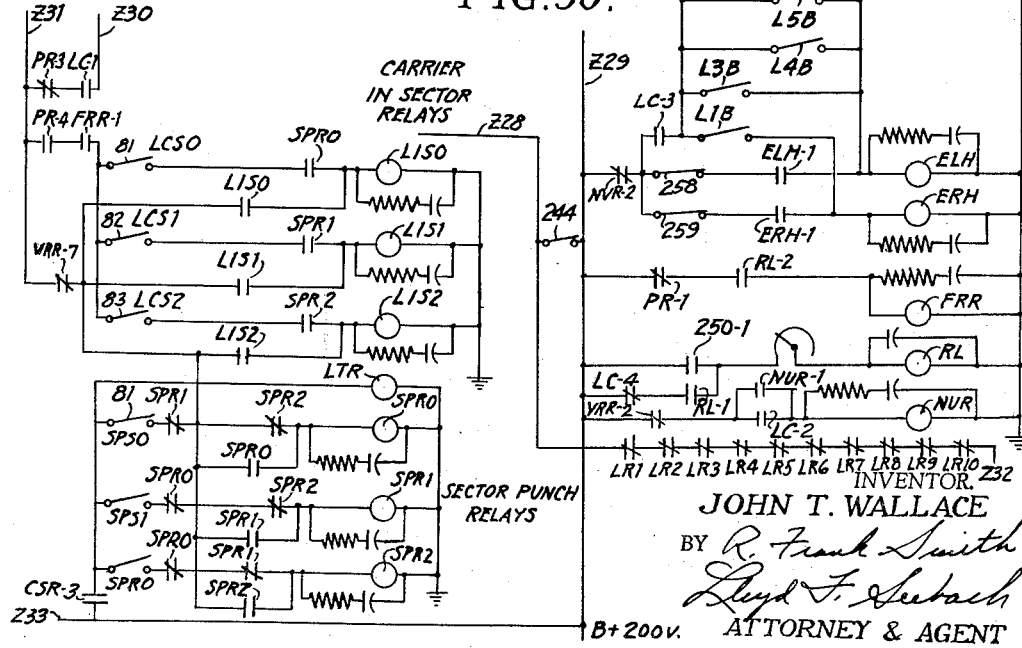
FIG. 30 is a schematic wiring diagram of the portion of the circuitry relating to the sector relays.
Figure 31:
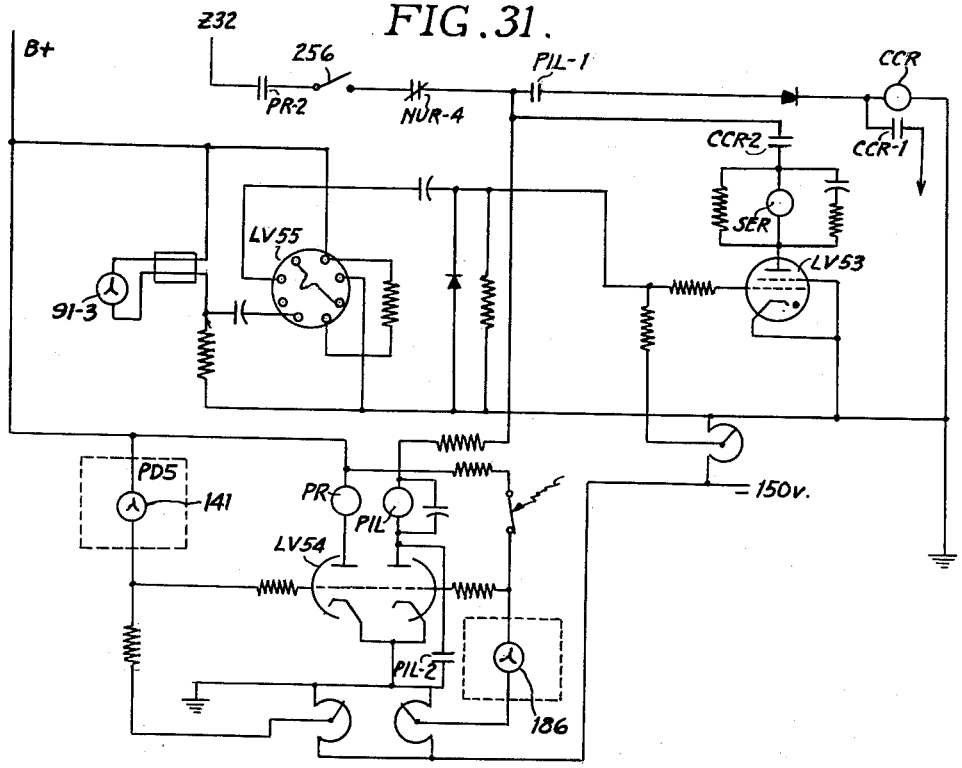
FIG. 31 is a schematic wiring diagram of the portion of the circuitry for controlling and checking the position of the carrier mechanism with respect to the storage device in the normal or home position of the envelope carrier.

When an envelope is inserted in the envelope carrier 117 by the operator, the mirror 184 is deflected so as to change the state of detector 186 from light to dark thereby providing a signal on the grid of the tube LV54 to render this side of the tube conducting and thereby energize the relay PIL, see FIG. 31. The contact PIL–1 in the circuit of the continuous count relay CCR is closed thereby resulting in energization of the CCR relay which is then held in with the closure of its contact CCR–1, relay CCR being energized through the series of LR contacts, PR–2, switch 256 and contact NVR–4. The contact PIL–2 is also closed and this closure connects the output of tube LV54 to ground thereby de-energizing the right-hand side of LV54 but holding in the relay PIL. With the carrier 117 in the load or home position, detector 141 supplies a signal to the left-hand side of LV54, thereby energizing relay PR and holding the contact PR–1 open, the contact PR–2 closed, and the contact PR–3 open and switch 256 is held in a closed position. With the energization of relay CCR, its contact CCR–2 is closed and the energization of the sequence error relay SER then occurs when a signal is derived from the detector 91–3 which is applied to the control grid of the thyratron LV53 after being amplified and squared by the squaring circuit LV55. When the thyratron LV53 is fired, the relay SER is energized. With the energization of relay SER, its contact SER–1 in the circuit of the thyratrons LV43–52 is closed, see FIG. 26. The detector 91–2 which is in parallel across the gating circuits LV33–42 conditions these circuits for accepting signals from the detectors 64 which detect the first empty pocket appearing in any tier on the drum 10. The detector 91–2 serves to condition the detectors 64 so that they are active at the time the center of a pocket passes the detectors 64. If it is assumed that an empty pocket is detected in both the fourth and seventh tiers, these respective detectors will provide a signal to the grids of LV39 and LV36 to render these tubes nonconducting and thereby providing a signal which is transmitted to the grids of the thyratrons LV49 and LV46, respectively, to cause these thyratrons to fire and energize the relays LR4 and LR7 which are in their respective plate circuits. With the energization of these relays, their respective contacts LR4 and LR7 are closed to hold these relays in across the B+ supply and the ground lines. At the same time, the contacts LR4 and LR7 in the common line connecting the relays are opened. The B+ supply to LR4 is maintained through the closed contacts of LR1, LR2, and LR3. However, this line of potential is broken to LR7 due to the fact that the contacts LR4 in this line are open. By this arrangement of the contacts of the respective relays in the B+ supply line, the lowest tier of pockets is always utilized as the storage location for the envelope whenever more than one empty pocket is detected in an aligned group. This therefore limits the vertical movement of the envelope carrier 117 to the fourth tier in the above example. At the same time the contact LR4 in the series of contacts in FIG. 30 is opened to de-energize relays PIL and SER, but relay CCR is held in by its contact CCR–1.

Figure 29:
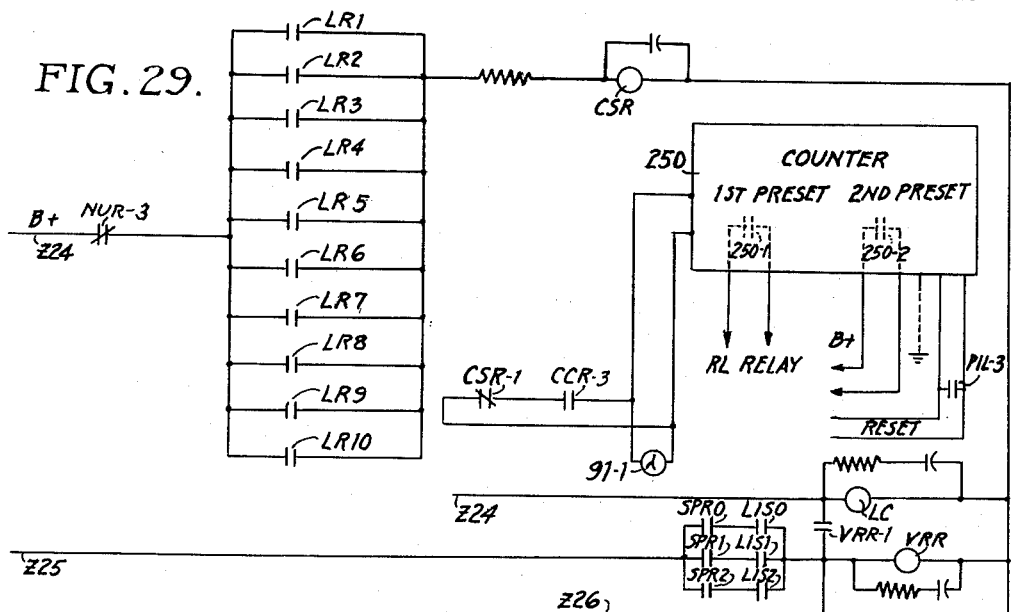
FIG. 29 is a schematic wiring diagram of a portion of the circuitry relating to the storage level counter.

With the energization of relay PIL as described above, its contact PIL–3 is also closed which results in resetting the counter 250 to a zero position, see FIG. 29. This counter is actuated to provide a count for each signal derived from the detector 91–1 as each hole 97 in the drum 10 and 98 in the brackets 38 successively pass this detector. The counter 250 provides two counts—the first being a number corresponding to the number of pockets which separates the detecting station 19 from the necessary start position of the envelope carrier 117 and the second count corresponding to the number of pockets corresponding to the required travel of the envelope carrier 117 from its load or home position to the position in which it is aligned with the pocket on the drum for receiving the envelope. In the present embodiment of the invention, a distance equivalent to 30 pockets is required for the envelope carrier 117 to be moved from its load or home position into position in alignment with the pocket on the drum for receiving the envelope. In addition, the detector station 19 is arranged 35 pockets ahead of the point at which the envelope carrier 117 is released for movement. The pocket detected for receiving the envelope to be positioned therein therefore moves a distance equivalent to 35 pockets at which time the counter 250 provides a signal which releases the drive mechanism for the envelope carrier to be moved toward the drum 10. The 30-pocket interval therefore represents the time or distance required for the envelope carrier 117 to make its travel from the home or load position to a position for inserting the envelope into the detected pocket, at which time a second signal is derived from the counter 250.

With the energization of the LR4 relay, its contact LR4 in the counter circuit is also closed and results in the B+ supply being applied to the counter start relay CSR. After relay CSR is energized its contact CSR–1 opens and counter 250 begins detecting and counting the pulses derived from the detector 91–1. With the energization of relay CCR, its contact CCR–3 closes to short out detector 91–1, the short being removed with the opening of contact CSR–1. Counter 250 is reset with the closing of the contact PIL–3.

Figure 24:
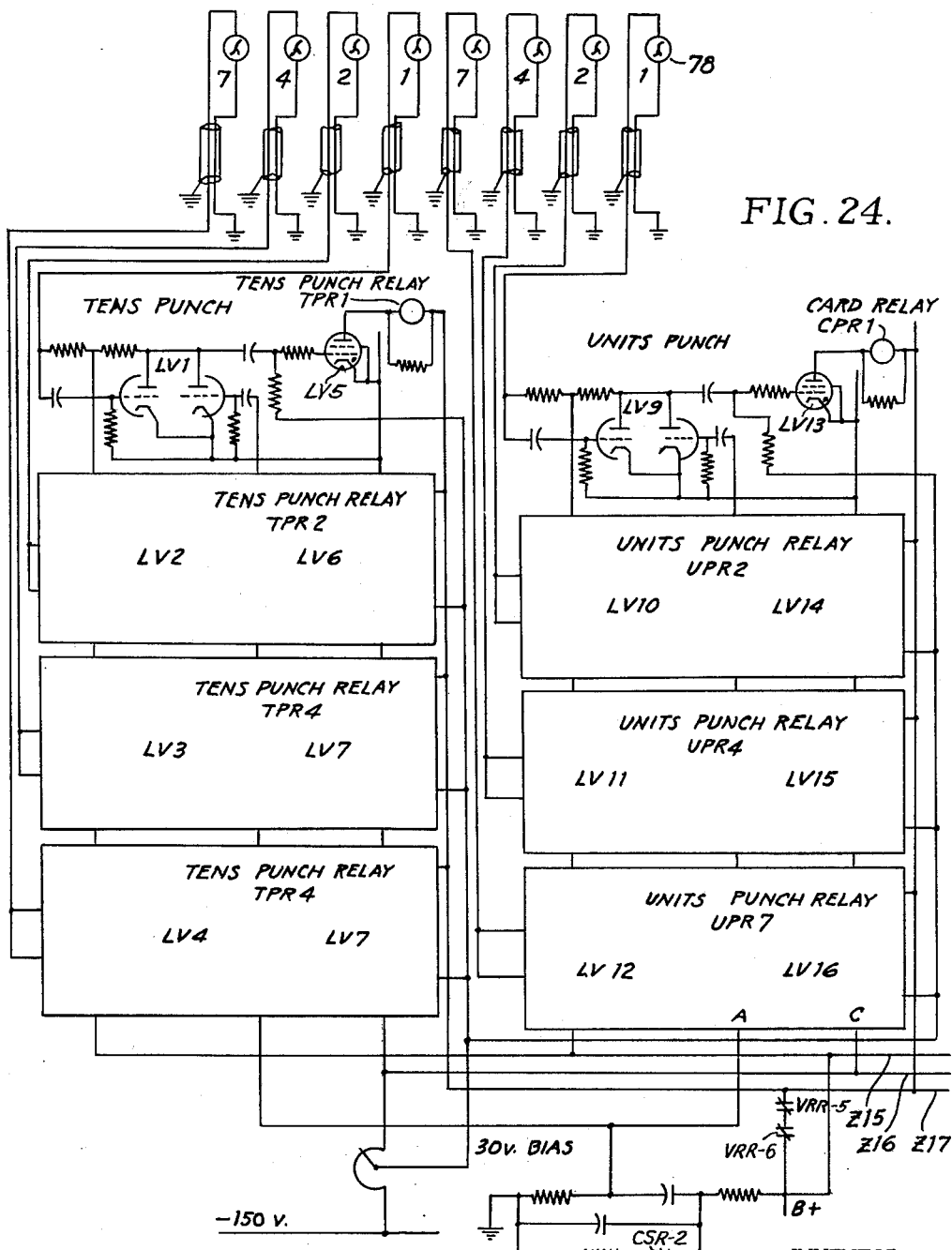
FIGS. 24 and 25 are schematic wiring diagrams of the pocket counting and checking circuitry.

With the energization of relay CSR, its contact CSR–2 in the circuitry for the card punch relays, as shown in FIG. 24, is also closed. With the closure of CSR–2 the gating circuits LV1–4 and LV9–12 are conditioned for receipt of the signals derived from the detectors 78 associated with the reading of code ring 70. If it is assumed that the pockets detected in the fourth and seventh tiers are No. 245, then the code ring 70 will furnish information as to the digits 4 and 5 and for the digit 2 the information will be derived from the sector switch 82.

Figure 32:
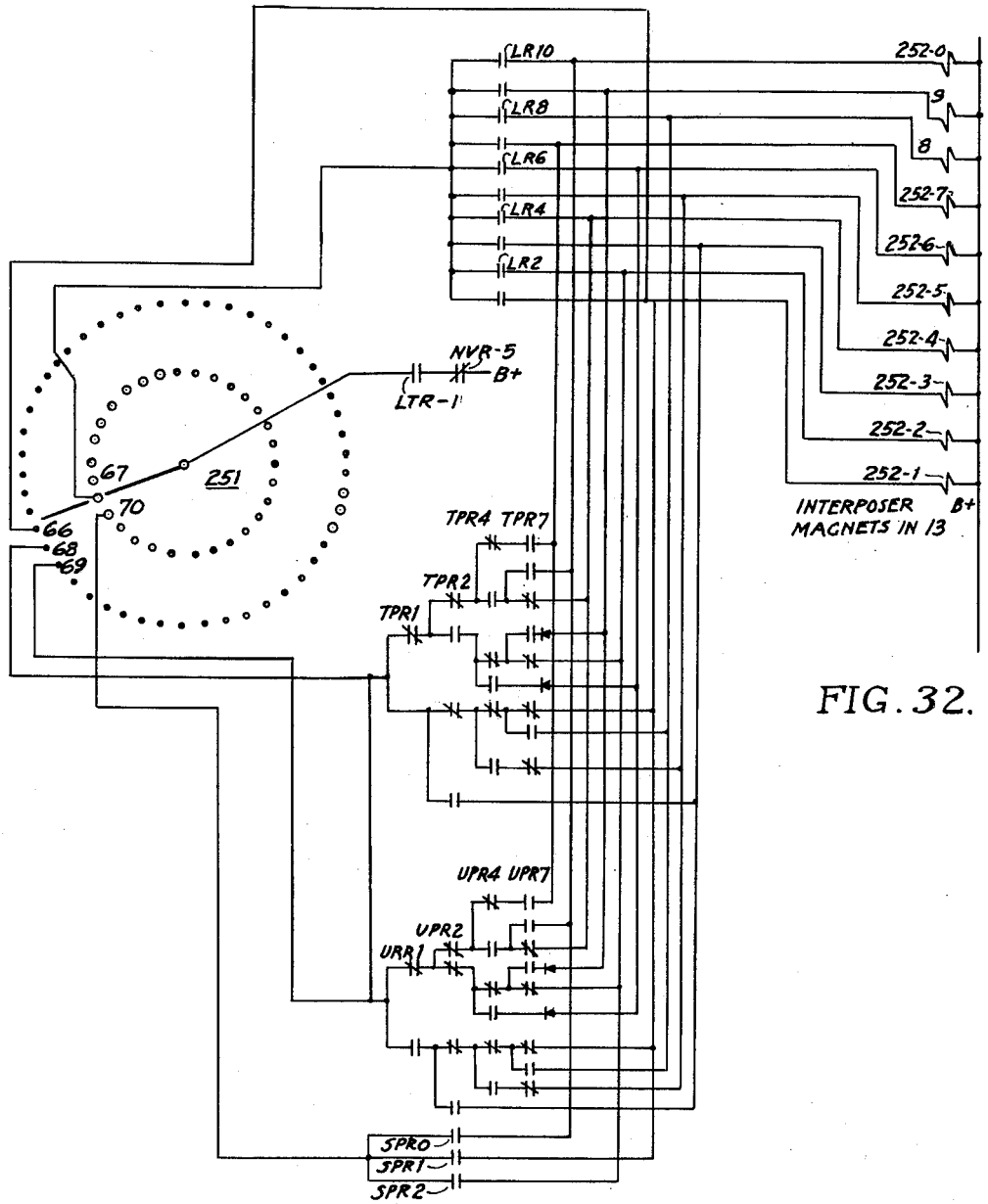
FIG. 32 is a schematic wiring diagram of the circuitry for actuating the means for recording the storage location of each envelope or article.

With particular reference to FIG. 32, the wiper switch 251 is associated with the key punch device 13 located adjacent the loading station. As stated hereinabove, the operator punches in the information contained on the envelope and then inserts the envelope into the carrier 117. On completion of the information derived from the envelope, the card is automatically advanced to the 66th column and for each drum the number of the drum is automatically punched into the card by the circuit through the wiper of switch 251, the contact 66 and the connection therefrom to the line of the interposer magnet 252–1 as shown in FIG. 32. The voltage to the wiper blade of the switch 251 was completed with the energization of relay LTR which closed its contact LTR–1 in this line upon energization of relay CSR and its contacts CSR–3. Since its was determined by the pocket detectors 19 that the first empty pocket was in the fourth and seventh tiers and the fourth tier is automatically selected as the proper tier, the energization of relay LR4 also closes its contact LR4 in the group of contacts shown in FIG. 32. The LR4 contact is connected to the contact 67 of the switch 251 and the circuit through the wiper blade, the contact 67, and the LR4 contact completes a circuit to the interposer magnet 252–4 to punch the tier number in the 67th column of the card. The card is again advanced to the 68th column and in this column the tens digit of the number 245 is punched in the card. This is accomplished by the energization of the relay TPR4 in FIG. 24 which is energized by the firing of thyratron LV7 as a result of the dectors 78 reading this digit number from the code ring 70. With the energization of relay TPR4, the contacts TPR4 in FIG. 32 are switched and a path is provided from wiper blade of switch 251 via the contact 68, the closed contacts of TPR–1, TPR2, TPR4 and TPR7 to the line common to the contact LR4 which is connected to the interposer magnet 252–4 to punch this digit in the 68th column of the card. In a like manner, the card is then advanced to the 69th column and the units digits 5 is obtained by the energization of the relays UPR1 and UPR4 in the units circuit in FIG. 32, these relays being energized by the firing of thyratrons LV13 and LV15 as a result of the code read by the detectors 78 from the code ring 70. With the energization of the UPR1 and UPR4 relays, the contacts thereof, as shown in FIG. 32, are switched. By this switching a circuit is provided through the wiper blade of switch 251, the contact 69 thereof and the arrangement of the contacts for the UPR1–7 relay contacts in FIG. 32. This path is through the switched contacts of UPR1 the closed contact of UPR2, the switched contacts of UPR4 and the contacts of UPR7 to the line of the interposer magnet 252–5. This, of course, results in the punching of the digit 5 in the 69th column of the card. The card is now advanced to the 70th column and in this column the sector number is punched in accordance with the switch actuated by the sector cams 84–86 within the drum. For the number 245 the pocket is located in the third sector and in this case the switch 83 is held in a closed position and, as shown in FIG. 30, with the closure of contacts CSR–3 a circuit is completed to energize the relay SPR2 which results in its contact SPR2 as shown in FIG. 32, being closed to provide a circuit through the wiper blade of switch 251, the contact 70, the closed contact SPR2 to the line of the interposer magnet 252–3 thereby providing a punching to complete the full address of the location of the card pocket. This card now contains all of the pertinent information with respect to the particular envelope which it is associated. Such a card is provided for each envelope which is placed by the operator in the envelope carrier 117 for storage on the drum 10. It is to be understood that the address of the pocket which is to receive the envelope is punched into the card at the time the first empty pocket is detected by the detecting means 19 which is coincident with the reading of the pocket number by the detectors 78 as encoded on the ring 70.

At the instant the empty pocket is detected and its address recorded on the card automatically, the detector 91–1 starts to provide periodic pulses to the counter 250 which are derived from the holes 97–98 in the bottom of the drum. With the 35th count a pulse is derived from the counter which results in actuating a relay within the counter to close a contact 250–1 which is in the circuit of the load relay RL as shown in FIG. 30. The relay RL closes its contact RL–1 and is thereby maintained in an energized state. It should also be pointed out at this time that the pocket detecting means 19 is located with respect to the position at which the envelope is fully inserted in the detected pocket by a distance equivalent to 65 pockets, by way of example. Also, the time required for the envelope carrier 117 to be moved from the position in which the envelope is loaded therein to the position with respect to the drum 10 in which the envelope is inserted in the detected pocket is equivalent to the time required for 30 pockets to move past a fixed point with respect to the drum. As a result, the counter 250 provides two counts, one of which occurs with the counting of 35 pockets at which time the envelope carrier 117 is released to start its movement toward the drum 10. The second count derived from the counter 250 occurs with the count of 65 pockets which is concurrent with the alignment of the envelope carrier 117 with the pocket detected at the detecting station 19. The detecting means 19 can actually be located at any point beyond the 30-pocket designation and the 65-pocket position is chosen arbitrarily, the counter 250 being set for the necessary counts in accordance with the location of the detecting means 19. As described above, it is at this point with a "35" count that the signal is derived from the counter 250 which energizes the load relay RL.

Figure 26:
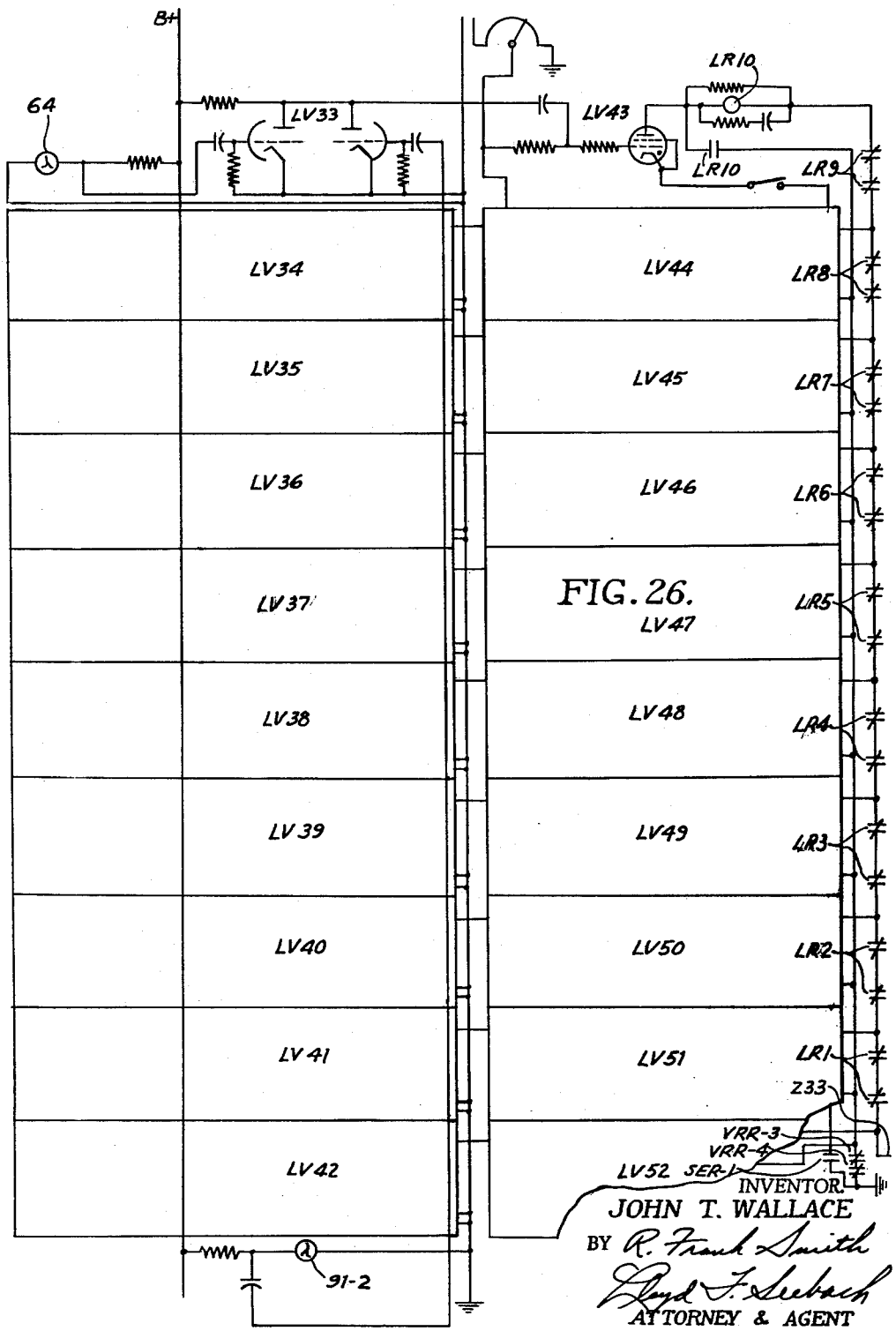
FIG. 26 is a schematic wiring diagram of the portion of the control circuitry relating to tier locating and detection.
Figure 27:
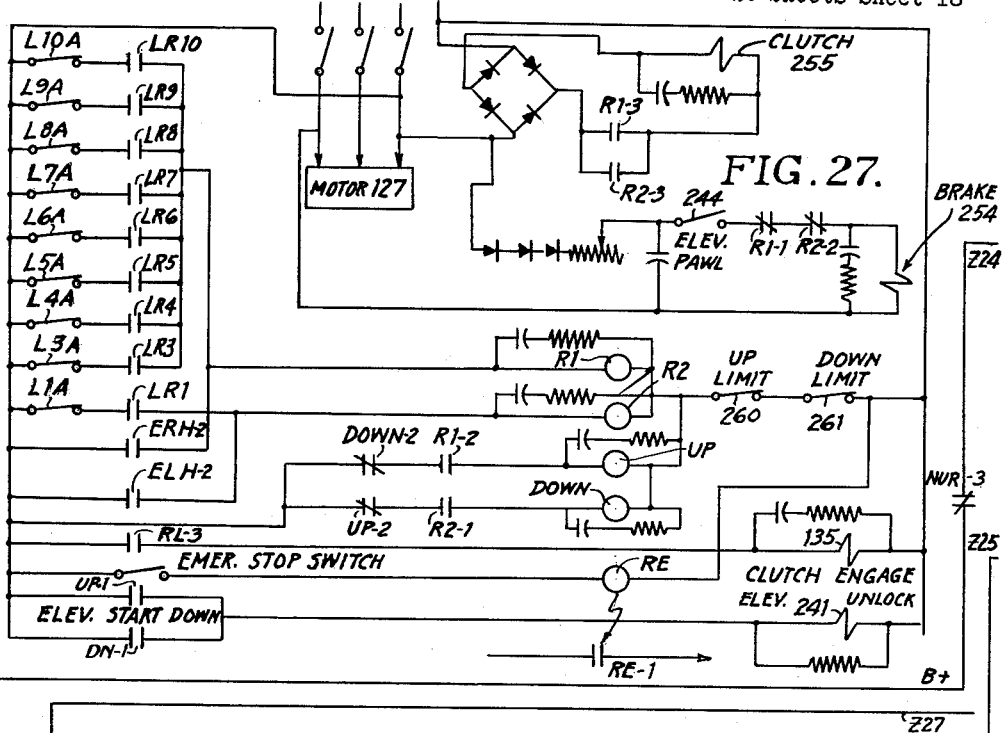
FIG. 27 is a schematic wiring diagram of a portion of the circuitry for controlling the carrier elevating mechanism.

With reference to FIG. 27, the contact LR4 will be closed at the time the tier number of the empty pocket is detected at the detecting station 19 by its relay LR4 in FIG. 26. The closure of LR4 provides a circuit through switch L4A, contact LR4, the relay R1 and the limit switches 260 and 261 to provide a circuit to ground for energizing the relay R1. This relay controls the movement of the mechanism for driving the envelope carrier 117 in an upward direction for location with respect to the proper tier. With the energization of relay R1, its contact R1-1 in the braking circuit 254 is opened and causes the brake to be de-energized and thus released. The contact R1-2 in the elevation starter circuit results in the energization of the relay UP which controls the direction of the drive motor 227. The closure of the contact R1-3 in the clutch circuit 255 causes the clutch to become engaged but shaft 226 is held against movement inasmuch as the disks 229 and 230 are held by the release mechanism 228. However, with the energization of relay UP, its contact UP-1 is closed which results in the energization of solenoid 241 thereby releasing the pawls 232 from the slots 231 in the disks 229 and 230 which permits the clutch 255 to couple the motor 227 to the shaft 226 and sprocket 224 to drive the envelope carrier in a vertical and upward direction. The preparation of the drive mechanism for moving the carrier 117 in either an up or down direction therefore takes place in the interval between the detection of the empty pocket and the first count signal derived from the counter 250.

With the energization of relay RL as a result of the "35" count signal from the counter 250, its contact RL-1 is closed to maintain this relay in an energized state. Its contact RL-2 is also closed and when hole 140 in plate 122 moves away from detector 141, relay PR is de-energized and its contact PR-1 closes and causes energization of the first revolution relay FRR. The contact RL-3, as shown in FIG. 27, is also closed and with closure of this contact the solenoid 135 is energized to release the stop link 126 from the slot 128 in the plate 122 thereby providing and permitting pawl 123 to engage the ratchet 120 and provide a driving connection between the drum gear 32 and the shaft 100.

In view of the above description, it should be evident that the mechanism for driving the envelope carrier in a vertical direction takes place following the detection of the empty pocket into which the envelope is to be inserted. On the other hand, the release of the mechanism for driving the envelope carrier from the load position to a position aligned with the detected pocket and then back to the load position occurs with the "35" count derived from the counter 250. In the event the empty pocket detected at station 19 had been in the first tier, then the contact LR1 in FIG. 27 would have been closed and the relay R2 would be energized thereby resulting in its contact R2-1 being closed to energize the starter relay DN. The contact R2-2 would then be opened to release the brake solenoid and the contact R2-3 would be closed to energize the clutch 255. With the energization of the relay DN, its contact DN-1 would be closed to energize the solenoid 241. In this case the motor 227 would be driven in a direction to move the envelope carrier in a downward direction toward the first tier. It will be noted in FIG. 27 that no contact is provided for the second level or home position. Since the envelope carrier 117 is normally brought to rest at its home position in the second level, no vertical movement in either direction is required if a pocket is detected in this particular tier. As a result, no provision must be made to drive the carrier 117 in either vertical direction but only to drive the carrier from its load position to a position for inserting the envelope into the pocket on the drum and then returning it to the home position. This is accomplished in exactly the same way and in the same time relationship as described above and takes place when the relay RL is energized and its contact RL-3 is closed to energize the solenoid 135 which results in the drive connection being made between the drum 10 and the shaft 100.

Since the elevating drive is started with the detection of the empty pocket, it should be evident that as the envelope carrier is moved vertically upward it will be brought into position with the lower tiers before the drive for the shaft 100 is released. As a result, the carrier will remain opposite one of the lower tiers until the signal is derived from the counter 250 to initiate the drive for positioning the envelope carrier 117 with respect to the pocket on the drum for receiving the envelope. On the other hand, if the empty pocket is detached in one of the uppermost tiers, the release of the drive for the shaft 100 can occur during the time the carrier is still being moved in a vertical direction.

As the carrier is driven in a vertical direction, the cam plate 218 carred by the counterweights 206 actuates the spaced microswitches 219 which are normally closed. Since only one of the LR contacts in the circuit in FIG. 27 will be closed, the actuation of any of the microswitches 219 has no effect until the one which is in series with the closed LR contact is actuated by the cam 218. When this occurs, the circuit through the R1 or R2 relays will be broken, the one which is broken depending on the direction of movement of the carrier 117. When this occurs, the brake 254 will then be energized, the clutch 255 will be de-energized and since the relay UP or the relay DN will also be de-energized with its respective R1 or R2 relay, the solenoid 241 will be de-energized and the pawl 232 will drop into the notch 231 in the plates 229 and 230 to arrest further movement of the shaft 226 and the sprocket 224. Under the conditions assumed above, the carrier 117 will be halted at a level with the pockets in the forth tier.

As described above, the drive for the carrier 117 to move it about the shafts 100 and 101 to a position in which the envelope is inserted in the detected empty pocket was accomplished with the energization of the RL relay. As the envelope carrier 117 is driven around the end of sprockets 114 and toward the drum 10, it approaches a straight line of travel and the roller 163 engages the cam 119 to commence ejection of the envelope from the carrier. At a point about 4 inches before the pocket and the envelope carrier are in exact alignment, the envelope commences to be inserted into the empty pocket as the slide member 158 is moved toward the drum by cam 119. At the moment the pockets are completely aligned, the envelope is fully inserted in the detected empty pocket and roller 163 is at the maximum or high point of cam 119.

Figure 25:
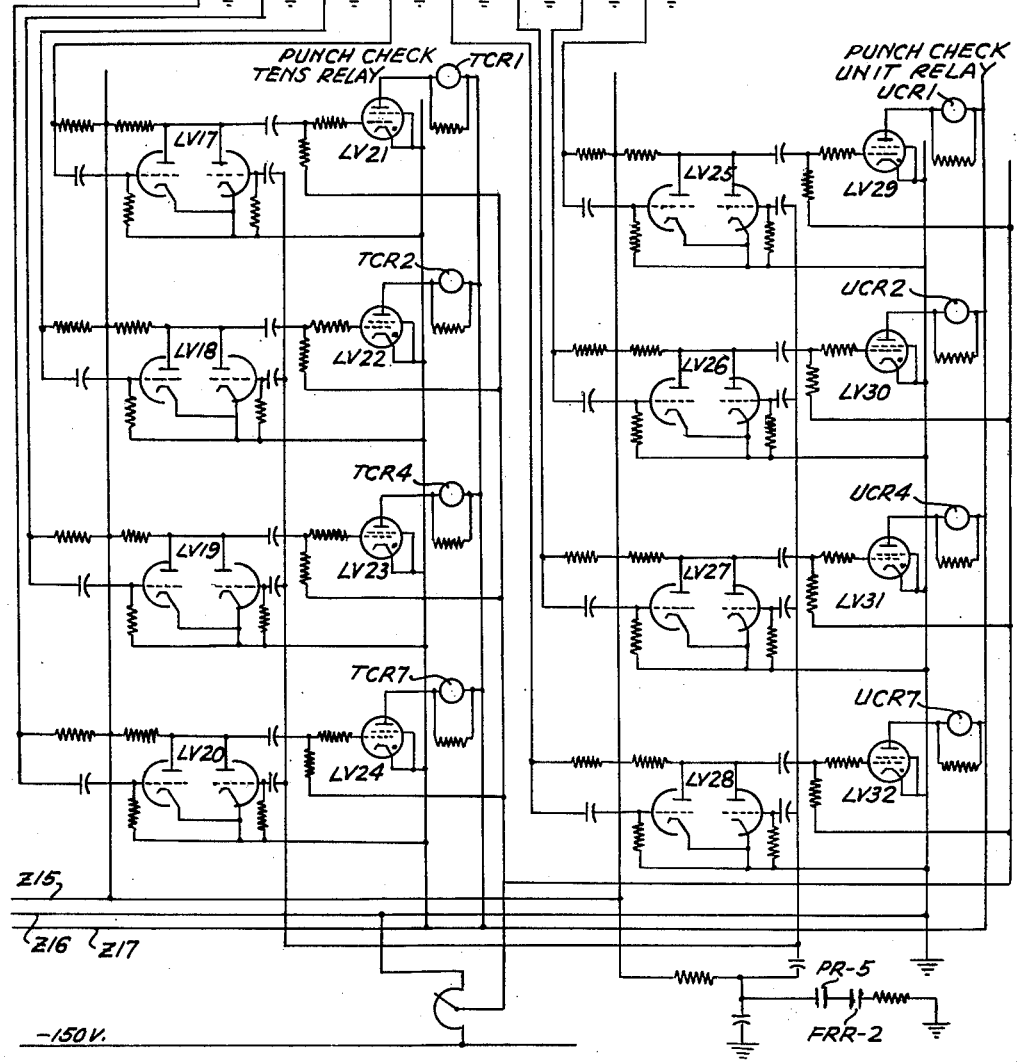

With reference to FIG. 31, detector 141 which is located below the plate 122, as shown in FIG. 12, provides a signal to the gating circuit LV54 to maintain the relay PR energized so long as there is no movement of the shaft 100 which occurs so long as the envelope carrier 117 is in the home position. When the solenoid 135 is energized to release the mechanism for holding shaft 100 against rotation and shaft 100 starts to rotate, the hole 140 is moved out of alignment with the detector 141 and its light source 142 and the relay PR is then de-energized. With the de-energization of relay PR its contact PR–1 closes and makes the circuit to the FRR relay. With the closing of contact RL–3, shaft 100 starts to rotate and hole 140 in plate 122 moves away from detector 141 thereby causing the left-hand side of LV54 and relay PR to become de-energized and with the closing of contact PR–1 energizing relay FRR. Relay FRR does not become energized until the carrier has moved out of the load position. Relay PR does not become energized again until plate 122 has made a complete revolution. However, due to the fact that relay FRR has a slow release time, the momentary pulsing of relay PR has no effect on the state of relay FRR. It is at this time that the check circuit, FIG. 25, is gated by the closing of contact PR–5 which discharges the capacitor C1 through FRR–2 to produce a negative pulse on the right-hand grids of LV25–28 thereby conditioning the check circuit. In the same manner contacts PR–4 and FRR–1 condition the circuits for relays LIS0, LIS1 and LIS2 which are energized, respectively, by the closing of switches 81, 82 or 83, see FIG. 30. After the second preset of the counter 250, relay LC is energized and its contact LC in series with RL–1 opens to de-energize relay RL and, hence, relay FRR by opening its contact RL–2. Relay FRR is, therefore, de-energized after the first revolution of shaft 100 and before it completes its second revolution.

Figure 28:
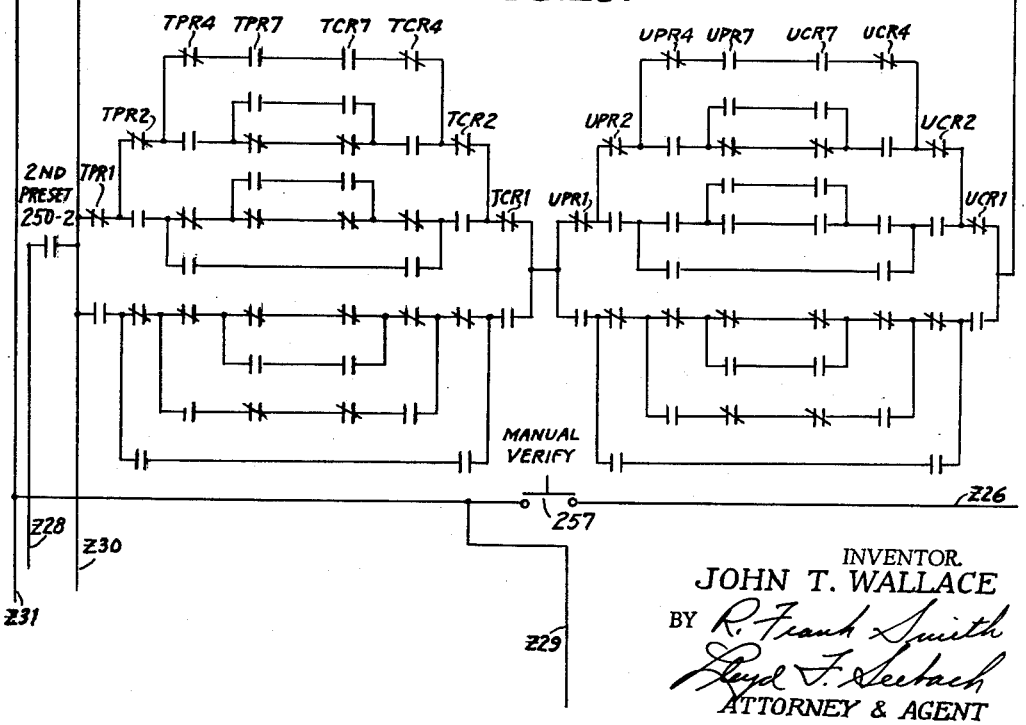
FIG. 28 is a schematic wiring diagram of the portion of the circuitry for controlling the recording of the storage pocket numbers.

As described hereinbefore, the envelope carrier 117 moves from the load position to a position in which it is in alignment with the pocket into which the envelope is to be inserted, and this movement is equivalent to one revolution of shaft 100, and hence, one revolution of the plate 122. As a result, at the instant the envelope is inserted in the empty pocket on the drum, the hole 140 is again aligned with the light source 142 and the detector 141 to provide a signal which causes momentary energization of the relay PR. When this occurs, the contacts associated with the relay PR assume their energized positions. At this same instant, the counter 250 provides the second predetermined count which is equivalent to 65 pockets and the contact 250–2 in the counter is then closed by its respective relay which is duplicated in the contact circuit shown in FIG. 28. When the drive mechanism for raising the envelope carrier 117 in a vertical direction is released, the microswitch 244 is actuated and has two sets of contacts, one of which is in the brake circuit 254 shown in FIG. 27, and the other of which is in the circuit of the contacts shown in FIG. 28. As a result, with the closure of contact 250–2, a circuit is provided through the contact matrix shown in FIG. 28. The contact matrix shown in FIG. 28 comprises the contacts of the relays TPR1, 2, 4 and 7, TCR7, 4, 2 and 1, UPR1, 2, 4 and 7, and UCR7, 4, 2 and 1 together with the contacts of the relays SPR0–2 and LIS0–2. As described hereinabove, the contacts in this matrix were switched in accordance with the number pocket detected in the station 19. In the example used as an illustration, the detected empty pocket resulted in the contacts of TPR4 and UPR4 and 1 being switched to provide the digits 4 and 5. An identical code reading device 72 is located at the load position with respect to drum 10 and at this point the code ring 70 is again read to verify the pocket into which the envelope is being inserted to determine whether it is in accordance with the pocket detected at station 19. With reference to FIG. 25, the gating circuits LV17–20 and LV25–28 are conditioned on the right-hand side with the closing of contact PR–5 and FRR–2 for the reception of the signals derived from the detectors 78 from the code ring 70 at the instant the envelope is inserted in the detected pocket. If the pocket number is the same, a signal will be derived from the plate of LV19 which will cause the thyratron LV23 to fire thereby energizing the relay TCR4 and causing these contacts in FIG. 28 to switch. In the same way the signals derived from LV25 and LV27 will result in the firing of their respective thyratrons LV29 and LV31 to energize the relays UCR1 and UCR4 to cause these contacts, as shown in FIG. 28, to switch. Since a group of switches 81–83 are also associated with the code reader in this position at the drum, the switch 83 will be closed and since SPR2 is still energized, its contact will be closed thereby energizing the relay LIS2 in FIG. 28 the contacts SPR2 and LIS2 will therefore be closed. Once these various contacts in FIG. 28 have been switched as described above, a circuit is derived from the B+ line through the switch 244, the closed contact 250–2, the matrix of the TPR and TCR contacts, the matrix of the UPR and UCR contacts and the contacts SPR2 and LIS2 to energize the verify relay VRR. When this occurs, the contact VRR–1 is closed and the load complete relay LC is energized and with energization closes its contact LC–1 which with contact PR–3 maintains relay LC in an energized state.

If the switching of the contacts in FIG. 28 is such that an output is not received to energize relay VRR which would indicate that there is a discrepancy between the number read in the detection station 19 and the number read in the load station, the circuit through relay LC is nevertheless completed and results in its contact LC2 being closed to establish a circuit through the non-verify relay NVR as shown in FIG. 30. This relay then causes its contact NVR–1 to close and to maintain the relay in an energized state. At the same time the contact NVR–2 is opened to prevent the carrier 117 from being returned to its home position, the contact NVR–3 is opened to break the circuit to relay CSR, the contact NVR–4 is opened to break the circuit to relays CCR, SER, and PIL, and the contact NVR–5 is opened to break the circuit to the emitter switch 251. When this occurs the operator is able to read from an indicator board the number of the pocket into which the envelope has actually been inserted and records this number for later retrieval of the envelope by manual means. In this instance, in order to return the carrier to its home position, the manual verify switch 257 is actuated by the operator and this energizes the verify relay VRR to complete the cycle of operation.

As described above, the cam plate 218 actuates the microswitch at the level of the detected pocket which in this instance is the microswitch L4A which is open and which contains a second set of contacts which are closed when actuated by this cam, as shown in FIG. 30. Since the switch L4B is closed, with the energization of relay LC the contact LC–2 is closed to provide a circuit through this contact and the switch L4B to energize the elevation lower to home position relay ELH. With the energization of the relay ELH, its contact ELH–1 is closed to maintain it in an energized state. It should be pointed out at this time that with energization of the VRR relay, either by a verification of the envelope address as derived at the station 19 and the loading station 12 or by manual verification by means of switch 257, in both instances the contact VRR–2 is opened to release the relay NVR. Also, the contact VRR–7 opens to clear the relays LIS0–LIS2 and SPR0–SPR2. When this occurs, of course, the contacts of relay NVR will return to their normal positions and the contact NVR–2 will assume its normally closed position to permit energization of the relay ELH upon closure of the contact LC–2. If the carrier had been moved to the first tier, the switch L1B would be closed and in this instance the elevation raise to home position relay ERH would be energized and held in by means of its contact ERH–1. Upon energization of either the ELH relay or the ERH relay, the contacts ERH–2 and ELH–2 in FIG. 27 will be closed to energize the respective relay R–1 or R–2 to again provide a sequence of operation wherein the brake 254 is released, the clutch 255 is engaged, and the solenoid 135 is energized to drive the envelope carrier in the proper direction to return it to the home position for receiving the next envelope. When the relay VRR is energized as described above, that is, either by verification of the pocket number or by manual verification, the contacts VRR-3 and 4 are opened, thereby releasing the relay LR which is in an energized state to prepare this circuitry for the next pocket to be detected. In the same way, the contacts VRR-5 and 6 are opened in FIG. 24 to remove the power from the relays TPR and UPR thereby de-energizing these relays in preparation for the reading of the next pocket to be detected. When the carrier 117 is in the "home" position, the loader switch 256 is closed and the switch 244 is moved to its other position due to the movement of the solenoid 241. When the carrier 117 approaches the home position in either direction, either switch 258 or 259 is moved to an open position which breaks the circuit through the ELH or ERH relays, respectively, and upon opening of the contacts associated with these relays, the drive for the carrier is arrested thereby causing de-energization of the clutch and application of the brake controlling motor 227.

In order to eliminate the possibility of the carrier 117 being driven above the tenth tier or below the first tier, limit switches 260 and 261 are arranged at the upper and lower extremities of the post 205 adjacent the switches 219. In the same way, the loader home switch 256 is arranged adjacent the switch 219 at the level of the second tier for locating the carrier mechanism in the proper position and on either side of the switch 256 the switches 258 and 259 are arranged which control the de-energization of the relays ELH and ERH depending on the direction of movement of the carrier 117.

CYCLE OF OPERATION FOR RETRIEVAL

Figure 33:
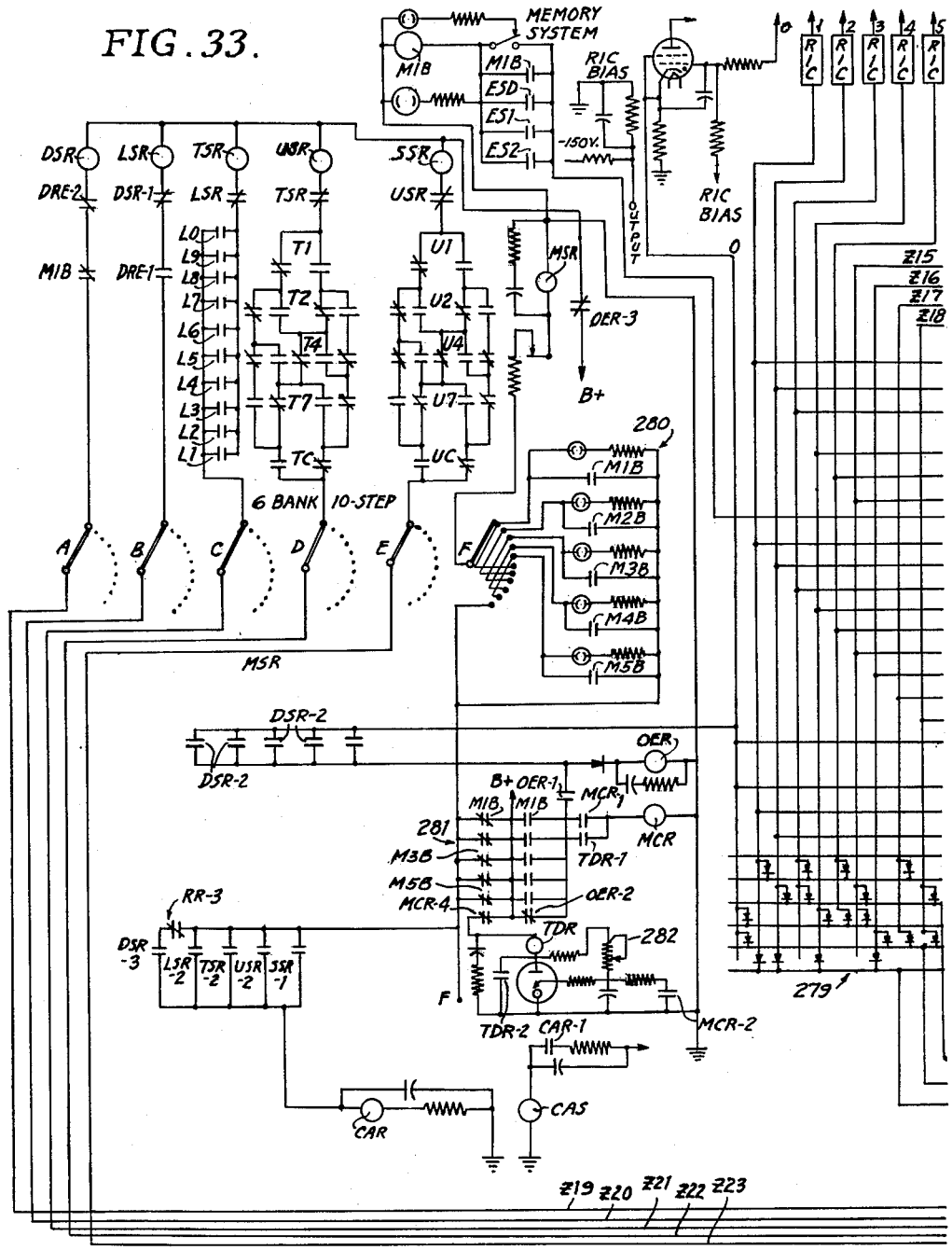
FIGS. 33 and 34 are schematic wiring diagrams of the memory circuitry for retrieval of the stored envelope or article.

As described under the heading "General Description," the envelopes which comprise a dealer's complete order are retrieved from one or more of the storage drums 10 by means of a card which contains the addresses of the envelopes for a particular dealer. In some instances, if the number of envelopes is excessively large, more than one card may be used to retrieve a single order. In the case of the disclosure described herein, IBM cards are utilized and each card is provided in a separate column with the drum number, tier or level number, the tens digit, unit digit, and sector number of each envelope. These cards are placed in the device 16 for reading the cards and transmitting signals derived therefrom to the circuitry disclosed in FIGS. 33-37, whereby a comparison is made between the numbers derived from the code ring 70 on each of the drums and the information derived from the cards to provide a match which, when this match occurs, operates an air valve 289 to eject the envelope corresponding to the given address location from the drum. A memory unit 265, as shown in FIG. 33, is associated with each eject station around a drum and is capable of storing five card addresses for comparison with the number of the pockets as the drum rotates past the ejecting station.

Figure 34:
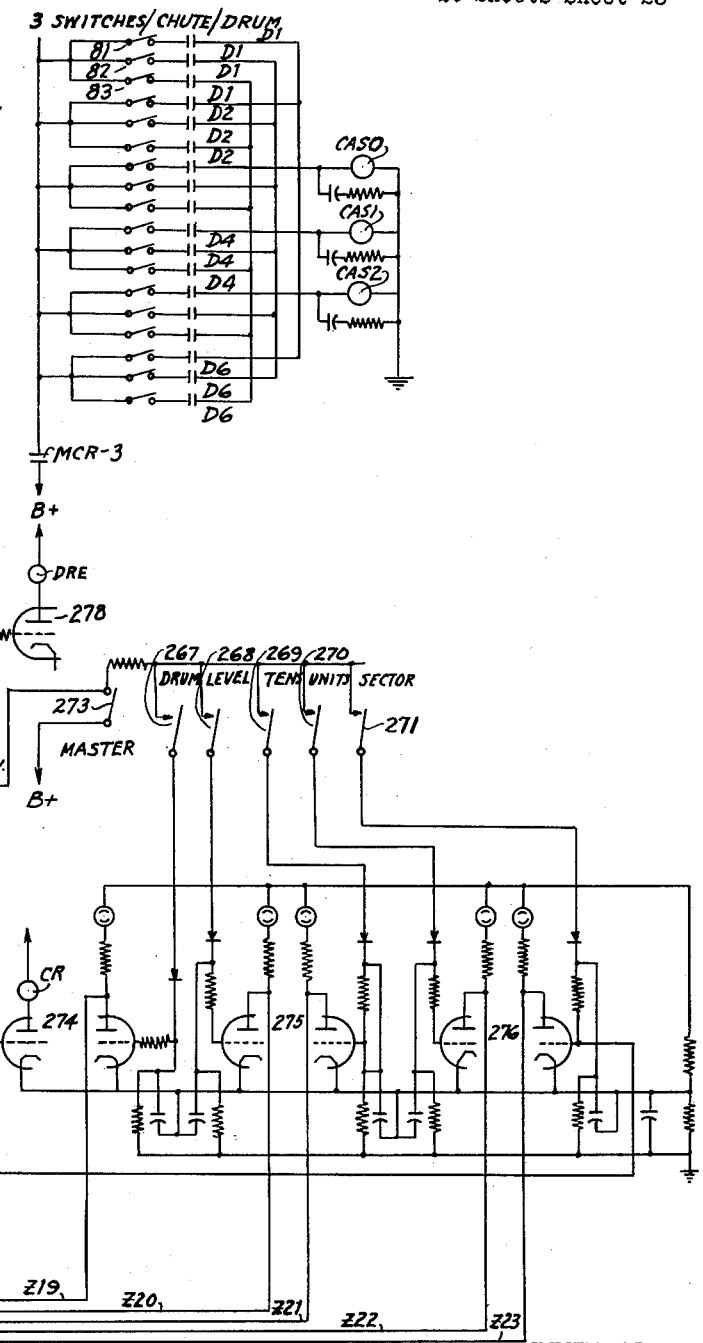
Figure 35:
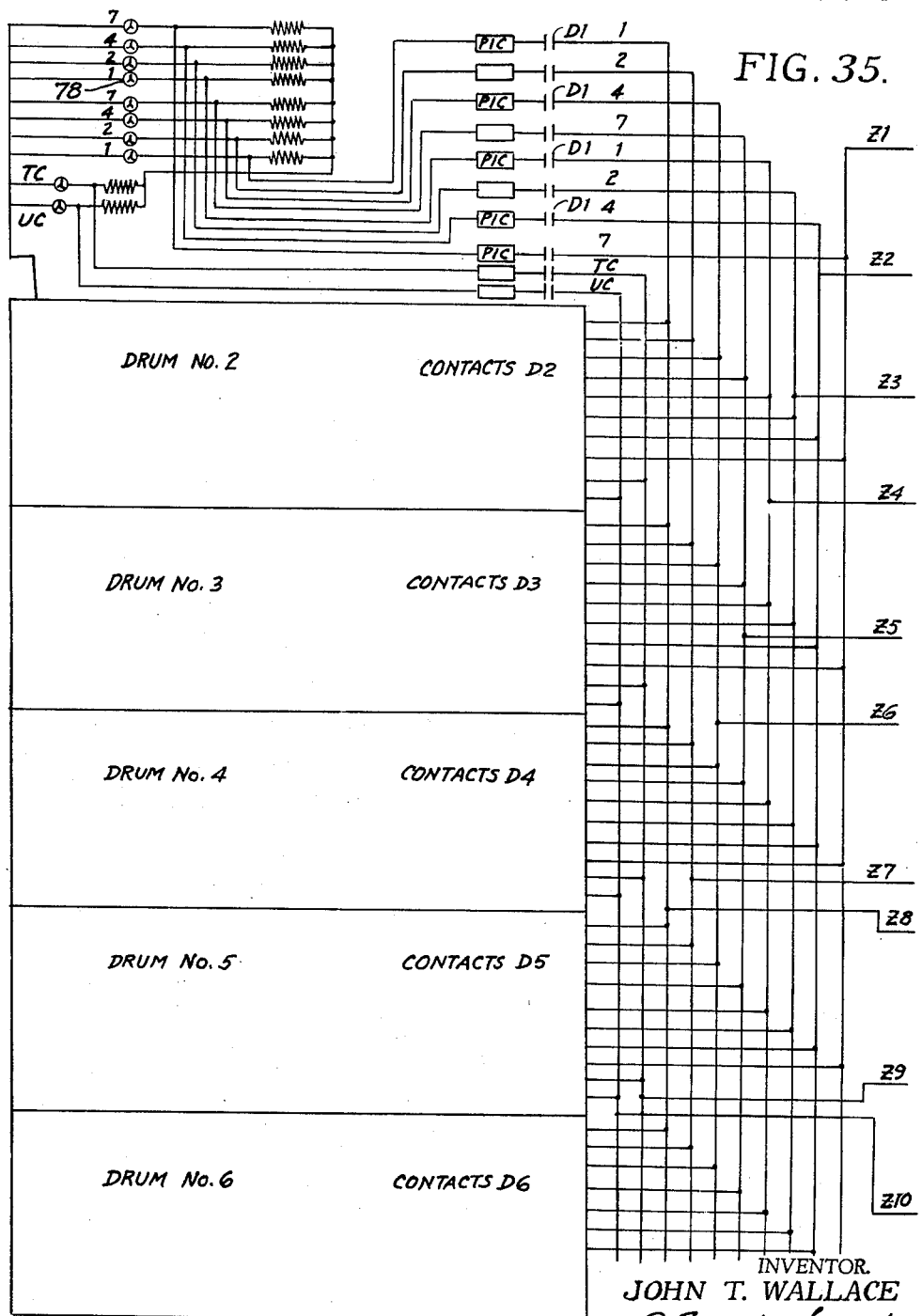

In the following description only a single memory unit is described for locating the envelope which for the purpose of illustration was stored in drum No. 1 and pocket 245. A code reading device 72 which is associated with the code ring 70, as described hereinabove, is arranged with respect to each ejection station 20 arranged about the drum. At each of these stations the serial number of each pocket is read by the detectors 78 as the code ring passes therebeneath. As a result, these successive signals from the detectors 78, as shown in FIG. 35, cannot be accepted by any of the following circuitry until the contacts designated by D-1 have been closed to permit transmittal of the signals to the circuitry which follows. Each of the blocks indicated in FIG. 35 contains circuitry identical to that disclosed in the detail arrangement at the top of this figure. With reference to FIG. 34, the card reader 16 shown in FIG. 1 is provided with a star wheel drive which successively closes the switches 267–271 as each column of the card is advanced past the reading station. This arrangement provides a signal to the control circuitry designated by the numeral 272 and only the switches are shown. It should be understood that the card is advanced intermittently and only one of the switches 267–271 is closed while the card is stationary and the column associated with the closed switch is read only when the card is moving and this column has been moved out from under the associated switch. The card advance relay CAR referred to hereinabove has a contact CAR-1 in the circuit of the card advance solenoid associated with the card reader 16. As a result, whenever relay CAR is actuated, its contact is closed to energize the card advance solenoid CAS which results in advancement of the card. This sequence of operation will become more evident from the description which follows.

The master switch 273 is closed to provide a B+ source of voltage and serves to reset the control circuitry 272 with each cycle of operation which comprises the address or location of a particular envelope. In the example which is described in detail hereinafter, it will be assumed that the envelope in storage is in the same pocket, sector and tier number as described hereinabove and stored in the No. 1 drum. As a result, as the card bearing this address information is advanced through the card reader 16, the star wheel in the reader first closes the drum contact switch 267. With the closure of this switch a signal is applied to the right-hand grid of the control tube 274 to render this tube conducting and the signal at its plate is connected to the wiper blade of the A bank of the memory stepping switch MSR. Assuming for the time being that the memory stepping switch MSR is in the first position, the signal on the wiper blade will be transmitted through the normally closed contacts M1B and DRE-1 to energize the drum selection relay DSR. With the energization of this relay, its contacts DSR-1 in the adjoining line, which includes the level selection relay LSR, is opened to prevent any transient signals from energizing the LSR relay. In addition, the contacts DSR in the relay circuit 277 are also closed. The DSR-2 contact is also closed in the circuit for the order end relay OER in the event a signal indicating a zero is derived from the card as will be explained hereinafter. At the same time, the contact DSR-3 is closed and a voltage is supplied through the M1B contact which is closed, the contact RR-3 and the DSR-3 contact to the card advance relay CAR which, when energized, closes its contact CAR-1 to energize the card advance relay CAS. As the card is advanced, the column in which the drum number is encoded is read by the sensing device in the reader 16 and a signal is derived from this column which appears at the one position in the relay circuit 277. As mentioned above, this signal will designate the No. 1 drum and since only the DSR contacts in the relay circuit 277 are closed, this signal will cause energization of the relay D-1 which, when energized, will close its contact D-1 to hold this relay in. With the closure of the contact D-1, a signal is applied to the grid of the tube 278 to render this tube conducting thereby energizing the drum relay DRE. With the energization of the relay DRE, its contact DRE-1 in the circuit of the LSR relay is closed. With the advancement of the card, the drum switch 267 opens and when the card comes to rest, the level switch 268 is closed. The drum selection relay DSR becomes de-energized with energization of relay DRE and the opening of its contact DRE-2 and the contacts of relay DSR assume their original circuit condition. However, as mentioned above, the relay D-1 is maintained in an energized state and also holds in the relay DRE.

With the closure of the level switch 268 a signal is applied to the left-hand grid of the tube 275 and upon being rendered conductive, a signal is derived from its plate which is transmitted to the wiper blade of the B bank of the memory selector switch MSR. This signal is transmitted through the closed DRE–1 contact and the closed contact DSR–1 to energize the level selection relay LSR. With the energization of relay LSR, its contact LSR–1 opens in the tens selection relay circuit to prevent any transient signals from operating the relay TSR and its contacts LSR in the relay circuit 277 are closed. In the same manner as described above, the LSR–2 contact in the card advance relay circuit is also closed to cause energization of the CAR relay for advancing the card in the reader 16.

As the card is again advanced, the number encoded in this column is read by the reader 16 and a signal derived from the encoded information which in this case will indicate the fourth level of the No. 1 drum. Since the LSR contacts in the relay circuit 277 are closed, the signal indicating the fourth level is transmitted to the relay L4 to energize this relay which then closes its contact L4 to hold this relay in an energized state. At the same time the level switch 268 opens and as the card comes to rest, the switch 269 is closed. At the same time that relay L4 closes its contact L4 to maintain it in an energized state, it also closes its contact L4 in the circuit of the TSR relay. With the opening of level switch 268, the relay LSR is de-energized and its respective contacts assume their normal circuit condition and relay D–1 and relay L4 remain in an energized state.

With the closure of the switch 269 the other side of the tube 275 is rendered conductive and the signal at its plate is transmitted to the wiper blade of bank C of memory selector switch MSR. This signal passes through the closed contact L4 and the closed contact LSR–1 to energize the tens selection relay TSR. The energization of relay TSR causes its contact TSR–1 in the units selection relay circuit to open and to close its contact TSR–2 in the CAR relay circuit to advance the card. At the same time, the contacts of the relay TSR in the relay circuit 277 are also closed. The column of the card containing the tens digit of the address of the envelope is now read as the card advances for opening the tens switch 269 and closing the unit switch 270. Since a 1, 2, 4, 7 code is used for designating the pocket numbers in the three sectors of the code ring 70 on the drum, it is necessary to provide a diode matrix 279 for converting the signal derived from the IBM card to the 1, 2, 4, 7 code for use in comparison with the signals derived from the code ring on the drum. Also, as pointed out hereinbefore, a parity check is utilized with this 1, 2, 4, 7 code. As a result, since the envelope is located in pocket 245, the tens digit in this case is represented in the 1, 2, 4, 7 code by a single code mark. The matrix 279 is designed so as to provide two output signals when only a single signal will be representative of the number encoded on the card and designated by the code ring 70. In the illustrated example, the signal derived from the IBM card to designate the digit 4 will be transmitted into the matrix and two signals will be provided as outputs from the matrix for energizing both the relay T4 and TC. These relays will then close their contacts to maintain these relays in an energized state. At the same time the contacts T4 and TC contacts in the USR relay circuit will be switched and held in this switched position.

With the closure of switch 270 the left-hand side of tube 276 will be rendered conductive and a signal will be derived from its plate which will be transmitted to the wiper arm of the bank D of the memory selector switch MSR. This signal will pass through the contacts of the relays in the circuit of the units selection relay USR via the switched contact TC, the closed contact T7, the switched contact T4, the contact T2 and the contact T1 and TSR–1 to energize the USR relay. As in the previous description, the USR relay will open its contact USR–1 in the circuit of the relay SSR to prevent any transient signals from energizing this relay. Also, its contact USR–2 will be closed to energize the card advance relay as described with respect to the other circuits. At the same time the USR contacts in the relay circuit 277 will be closed. As the card advances, a signal will now be derived from the units digit column which in this case is indicative of the digit 5. This signal will pass into the matrix 279 and two outputs will be provided which will pass through the closed contacts USR to energize the U1 and U4 relays which, upon energization, close their respective contacts to maintain these relays in an energized condition. Since the digit 5 as derived from the IBM card necessitates both the digits 1 and 4 in the 1, 2, 4, 7 code, a parity is obtained in that two signals are derived from the matrix 279. With the energization of relays U1 and U4 the respective contacts in the circuit of the sector selection relay SSR are switched. With the advancement of the card, the units switch 270 is opened and the sector switch 271 then becomes closed.

With the closure of switch 271 the right-hand side of tube 276 is rendered conductive and the signal taken from the plate thereof is transmitted to the wiper arm of bank E of the memory selector switch MSR. This signal passes through the contacts of the UC, U7, U4, U2 and U1 relays as well as the closed contact of the relay USR to energize the sector selection relay SSR. With the energization of this relay, its contact SSR–1 is closed and causes the card advance relay CAR to be energized. Also, its contacts SSR in the relay circuit 277 are closed. As the card advances, the signal derived from the encoded number in this column, which is the digit 2 and indicative of the third sector on the drum 10, is applied through the closed contact SSR to energize the relay ES2 which is then maintained in an energized state with the closure of its contact ES2. With the energization of relay ES2, its contact ES2 in the circuit of the relay M1B is closed to energize this relay which then closes its contact M1B to maintain this relay in an energized position. At the same time, the relay MSR is energized which results in the stepping switch MSR being stepped to the next position for storage of the next envelope address on the card being read. With the energization of M1B, its contact M1B in the indicator circuit 280 is closed to energize an indicator lamp indicating that this first storage unit of the memory is loaded.

When a potential is first applied to the memory circuitry, the timing circuit 282 is conditioned through the normally closed contact MCR–4 and after an interval determined by the pot 283, the tube 284 fires to energize the time delay relay TDR. This results in the closures of its contact TDR–1 via the normally closed contact OER–1 to energize the memory clear relay MCR which then closes its contact MCR–1 to maintain it in an energized state. The relay TDR also closes its contact TDR–2 in the plate circuit of the tube 284 which results in shunting of this relay to ground. The MCR relay also closes its contact MCR–2 in the timing circuit and this contact is maintained in a closed position. The contact MCR–3 in the circuit for the ejector switches shown in FIG. 34 is also closed for a purpose to be described hereinafter.

With the energization of any one of the memory busy relays M1B, its respective contacts in the circuit 281 are switched but the circuit to the MCR relay is maintained through the normally closed contact OER–2. As the card continues to advance intermittently through the reader 16, each envelope location is stored in a memory switch position and upon completion of each address location, that is, with the actuation with the sector switch 271 to a closed position, the right-hand side of the tube 274 is also rendered conductive to energize the counter relay CR which closes its contact CR–1 in the circuit of the counter coil relay CC which effects a count in the counter of each address location which has been read. As will be apparent from the description which follows, the insertion of the envelope address information into storage is occurring as the drum continuously rotates and the pocket numbers are continuously read by the reading device 72 at the ejection station 20. Consequently, the storage of an address in any memory position is prevented by the opening of the memory busy contact in the circuit of the drum selection relay, as shown in FIG. 33, and once the envelope corresponding to the stored address has been ejected from the drum, the memory in which the address has been stored is again available to store another card address.

Figure 36:
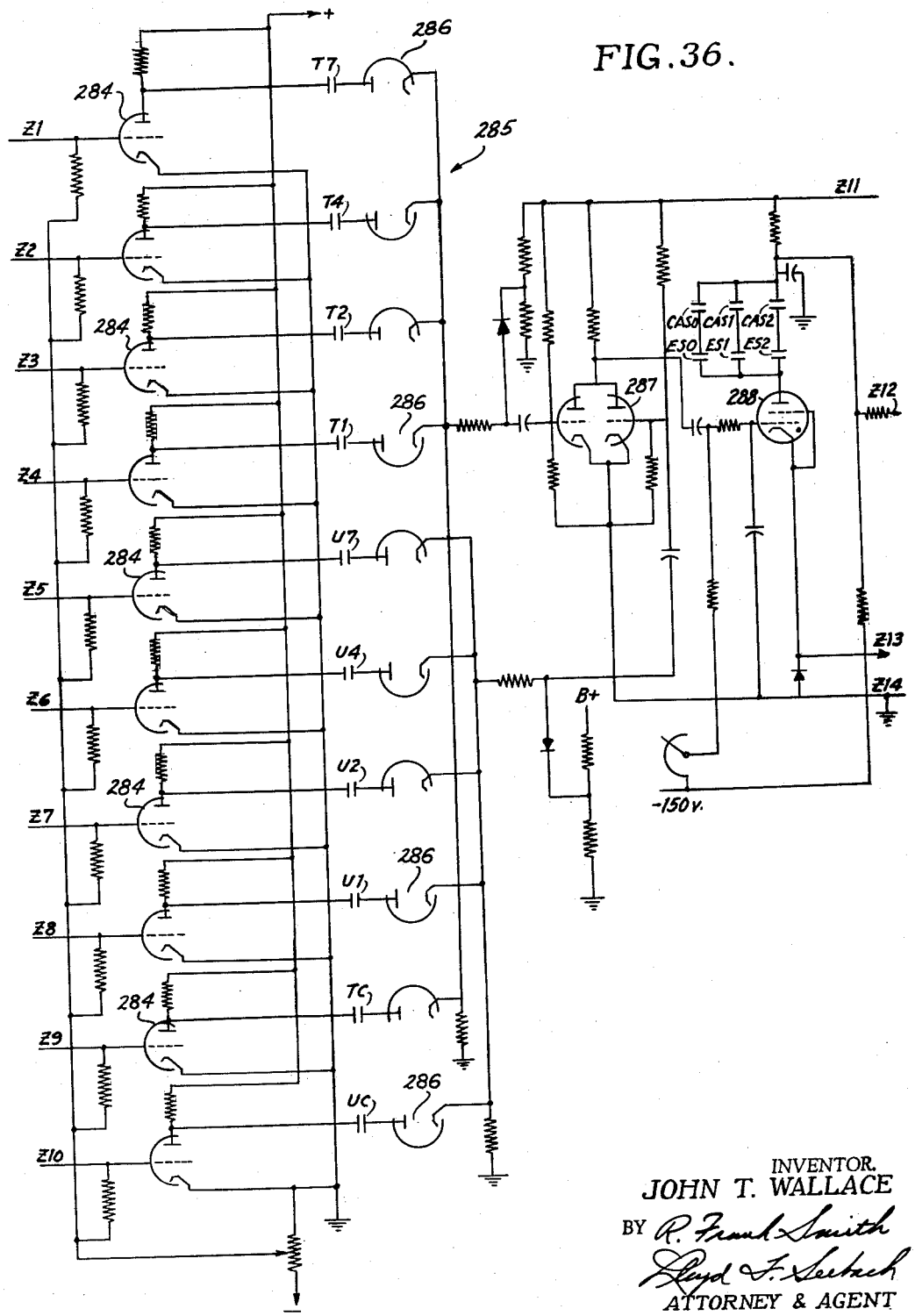

In accordance with the description thus far, in the relay circuit 277, relay D1, L4, ES2, T4 and TC and U1 and U4 will be energized to provide all of the information for the address of the envelope. With reference to FIG. 35, the relay D1 will have caused its contacts D1 to be closed and as the code ring 70 rotates with the drum, the three sector switches 81–83 will be successively closed to successively energize the relays CAS0, CAS1 and CAS2 from the B+ source of voltage through the MCR–3 contact which is closed and the respective switch which is closed by the sector cam. With reference to FIGS. 35 and 36 the relay D1 will cause its contacts in the circuit of the detectors 78 to be closed and in this instance the signals derived from the code markings on the ring 70 will be continually transmitted by the detector 78 through the closed contacts of D1. These signals will be applied to the grids of the tubes 284 in the circuit designated by the numeral 285 in FIG. 36. At the time that relays T4, TC, U1 and U4 are energized, their respective contacts in the plate circuits of the respective tubes 284 will be closed. As a result, the signals derived from the detectors 78 which correspond to T4 and TC as well as U1 and U4 will be the only signals transmitted to the respective diodes 286 in the circuit 285. The signals corresponding to the tens digit are transmitted from the common lead to the grid of the tube 287 and the signals derived from the units digit are transmitted from a common line to the other grid of the tube 287. However, there will only be one combination of signals which will result in the tube 287 being rendered nonconductive and these signals will be those appearing at the contacts T4 and TC and at U1 and U4. It is for this reason that a parity check is utilized since the two signals are required to drive either side of the tube 287 into a nonconducting state. When the relay ES2 is energized, its contact ES2 in the plate circuit of the thyratron 288 is also closed. However, with both sides of the tube 287 nonconducting and the resulting signal transmitted to the control grid of the thyratron 288, the tube cannot fire until the CAS2 contact in its plate circuit has been closed. This can occur only when the proper sector switch which is 83 in FIG. 34 has been closed and the CAS2 relay has been energized. If it is assumed that the memory has been loaded with the number 245 just as this pocket has passed the ejecting station and reading device 72, it will then be necessary for the drum to make almost a complete revolution before this pocket is again detected at the ejecting station. As the drum rotates, the digits 4 and 5 will first appear in the first sector (045) which will result in the CAS0 contact in the plate of tube 288 being closed but in this instance the contact ES0 is not closed. The digits 4 and 5 will next appear in the second sector (145) in which case the CAS1 contact will be closed but the ES1 contact will still be open. However, as the third sector actuates the switch 83, the relay CAS2 is energized to close the contact CAS2 in the plate circuit of 288 and with the contact ES2 already closed, a path is provided for the plate voltage of the tube when the signals derived from the tens digit 4 and the units digit 5 render the tube 287 nonconducting and the resulting signal from the plate circuit is applied to the control grid of tube 288. With the firing of the thyratron 288 a signal is derived from the cathode of this tube which is connected to the level selector contacts in FIG. 37. Since L4 in the relay circuit 277 has been energized, its contact L4 is closed and permits the signal from the thyratron 288 it be applied to the level 4 ejection solenoid valves of each of the drums. However, only the contacts with respect to the drum 1 have been closed by the relay D1 and hence the solenoid valve associated with the fourth level of drum No. 1 is energized. With the energization of this solenoid valve at the fourth level, a blast of air is impinged against the plate 45 on the rear side of the pocket which causes the pocket to pivot about its mounting point to eject the envelope into the chute 17. The air blast from the solenoid valve is projected through an opening in the drum which is arranged behind each pocket in each tier. The solenoid valves are commercially available items and are disclosed diagrammatically in FIGS. 2 and 2A by the numeral 289. When the thyratron 288 is fired, a signal is also derived from its plate circuit which is connected to the left-hand grid of the tube 290 and renders this side nonconducting to provide a signal which, in turn, renders the right-hand side of this same tube conductive thereby energizing the relay RR in the plate circuit of the right-hand side of this tube. With the energization of the relay RR its contacts RR–1 and RR–2 in the relay circuit 277 are opened thereby de-energizing the relays in this circuit which have been energized.

With the de-energization of the relays in the circuit 277 the memory M1B is conditioned to again be available for storage of another card address. This means that the various contacts which have been opened or closed by these relays now revert to their original condition. It should be pointed out at this time that a means is provided to permit all of the orders in memory to be cleared therefrom upon reading of the last envelope address on a card or a series of cards. The end of a dealer's order is designated by a punching in the zero position of the column following the last address location on a card and will therefore follow the sector or the last sector address designation. Therefore, as the card is advanced after the last sector code has been read, the drum switch 267 will again be closed by the star wheel actuating mechanism in the reader 16. This will result in the drum selection relay DSR being energized as described hereinbefore in one of the empty memory circuits. This will result in the DSR–2 contact being closed in the associated memory circuit as shown in FIG. 33 and as previously described, the card will then be advanced for reading the code designation in this column. Since the end of order is designated by a zero code indication, this signal as derived from the IBM card is applied through the closed DSR–2 contact to the order end relay OER which is then energized and with closure of its contact OER–1 and the opening of its contact OER–2, the relay OER is held in via one of the memory busy switches. The OER–3 contact in the circuit with the DSR, LSR, TSR, USR and SSR relays is opened, thereby preventing any of these relays from being energized and also resulting in de-energization of the relay DSR. The OER relay will therefore be held in so long as any one of the memories contain a card address. When the last of the memory busy relays has been de-energized as shown in FIG. 33, the B+ potential is removed from both the OER relay as well as the MCR relay which causes the contacts thereof to switch to their normal positions. When this occurs the MCR closed contact in the circuit of the TDR relay causes the timing circuit 282 to be initiated and the time interval provided by the pot 283 permits the last envelope to be retrieved to be cleared from the drum and the chute 17 before the relay TDR is again energized and returns the MCR relay to an energized condition. At this time the memory is again in condition and completely cleared to receive addresses for the next dealer's order. When relay OER is de-energized, its contact OER–3 closes and permits the reading of addresses to begin; however, contact MCR–3 prevents ejection of envelopes until the time delay has expired.

As pointed out hereinabove, each ejecting station associated with a drum is provided with a memory system such as disclosed in FIGS. 33 and 34 which is capable of storing five addresses. If by chance all of the envelope addresses are to be found in pockets arranged in the same sector of the drum and this particular sector has just passed the ejecting station so that none of these envelopes is retrievable until the drum has completed about two-thirds of a revolution, then all of the contacts in the memory busy circuit will be switched and the M1B–M5B contacts will all be opened thereby preventing any potential being applied to the memory stepping switch MSR and no further addresses will be received by this memory until one has been cleared. When this occurs, of course, the relay CAR and the card advance relay CAS cannot be energized and, hence, the card remains fixed in the reader until a memory has been cleared. The location of the first empty memory to be cleared is obtained by the F bank of the memory selector switch MSR. If it is assumed that the first memory to clear is the third memory, then the relay M3B will be de-energized and its contacts in the circuit 280 and 281 will return to their normal position. If it is further assumed that the wiper arm is associated or in a stop position with the first memory unit, the closure of the contact M3B in the circuit 281 will cause a potential to be applied through the contact M1B in the circuit 280 thereby energizing the relay MSR to advance the wiper arm to the second memory. However, the contact M2B of the second memory in 280 is also closed so the relay MSR is again energized and the wiper arm is moved to the third position or with respect to the third memory. In this position the contact M3B is open and the relay MS4 cannot be energized. As a result, the stepping switch MSR comes to rest with respect to a position associated with the third memory and in this position it is available for receiving the next envelope address. When this occurs, the card advance is resumed and the storage of an address proceeds as described hereinabove.

The storage and retrieval device described hereinabove discloses an arrangement whereby an article can be stored in any one of a number of pockets in any one of a number of tiers on a rotating drum and retrieved therefrom by means of an address location derived from the code reading device associated with the apparatus. In addition, the storage and retrieval operations can occur simultaneously and are related by the common address of the article which is derived upon storage and utilized for retrieval. While the mechanical and electrical elements of the invention have been described with respect to a particular embodiment, it is to be understood that variations in these elements can be made without departing from the spirit of the invention. The invention, therefore, is not to be limited to the disclosed embodiment but is of a scope as defined by the appended claims.

Having now particularly described my invention what I desire to secure by Letters Patent of the United States and what I claim is:

1. In a device for storing articles in random order and for retrieving said articles from storage, the combination comprising a cyclically movable member having a plurality of receptacles adapted to receive articles for storage, said member carrying address indicia representing each of said receptacles, carrier means for receiving an article to be stored and adapted, upon actuation of said carrier means, for moving said article into one of said receptacles, means for actuating said carrier means in response jointly to receipt of an article by said carrier means and to movement of a selected empty receptacle to a predetermined position relative to said carrier means, a first detecting means disposed in sensing relation to the indicia on said member for generating a series of signals representing the addresses of all of said receptacles, a second detecting means disposed ahead of said carrier means and in sensing relation to said receptacle for generating a select signal from each empty receptacle, means responsive to the select signal derived from the first empty receptacle moved past said second detecting means, upon receipt of said article by said carrier means, for recording a manifestation of a signal representing the address of said selected empty receptacle, means for reading a recorded manifestation of a signal representing the address of a designated receptacle in which is stored an article to be retrieved, and for generating a new signal representing the address of said designated receptacle, means for receiving and comparing said last-named signal and said series of signals and responsive to coincidence of said compared signals for generating an output signal, and means connected to said comparing means and responsive to said output signal for ejecting from said designated receptacle the article stored therein.

2. The combination in accordance with claim 1 and including means for comparing the address of the receptacle into which the article is being inserted for storage with the address of the empty receptacle.

3. In a device for storing articles in random order and for retrieving said articles from storage, the combination comprising a rotatable member having a plurality of receptacles for receiving the articles to be stored, said member carrying address indicia representing each of said receptacles, drive means operatively connected to the said member for imparting continuous rotation thereto, an article loading station arranged adjacent said member, a detecting station arranged ahead of said loading station, an ejecting station, carrier means arranged in said loading station for receiving an article to be stored and for moving said article into one of said receptacles, means, upon being rendered operative, for connecting said drive means to said carrier means, means arranged in said detecting station and initiated by the article received by said carrier means for generating an electrical signal from the first empty receptacle moving through said detecting station, means arranged in said detecting station and responsive to the electrical signal derived from said first detected empty receptacle for reading said address indicia and for generating an electrical signal corresponding to the address indicium of said empty receptacle, means responsive to the electrical signal corresponding to said indicium of said empty receptacle for recording a manifestation of the address of said empty receptacle, means responsive to said electrical signal derived from said first detected empty pocket for rendering said connecting means operative in accordance with a predetermined location of said first detected empty receptacle from said loading station, means at said loading station for comparing the address indicium of the receptacle into which the article is being inserted for storage with the address indicium of the first detected empty receptacle, means arranged in said ejecting station and disposed in sensing relation to the address indicia on said member for continuously generating a series of electrical signals representing the addresses of all of said receptacles, means for reading a recorded manifestation of signals representing the addresses of a plurality of designated receptacles in which the articles to be retrieved are stored and for generating new signals representing the addresses of said designated receptacles, means for storing a predetermined number of said new signals as derived from said recorded manifestation, means responsive to coincidence of the electrical signals corresponding to the same address indicium as derived from said member and any one of said signals in said storing means for providing an output signal, and means arranged in said ejecting station and responsive to said output signal for ejecting the article stored in one of said designated receptacles as it is moved through said ejecting station.

4. In a device for storing articles in random order and for retrieving said articles from storage, the combination comprising a rotatable member having a plurality of receptacles arranged about said member and vertically aligned in a number of tiers, said member carrying address indicia representing each of said receptacles in each vertically aligned group, first drive means operatively connected to said member for imparting continuous rotation thereto, an article loading station arranged adjacent to said member, a detecting station arranged ahead of said loading station, an ejecting station, carrier means arranged in said loading station for receiving an article to be stored and for moving said article into one of said receptacles, means, on being rendered operative, for connecting said first drive means to said carrier means, means arranged in said detecting station with respect to each tier of receptacles and initiated by the article received by said carrier means for generating an electrical signal from the first empty receptacle in any one of said tiers moving through said detecting station, said electrical signal being representative of the tier number, means arranged in said detecting station and responsive to the electrical signal derived from the first empty receptacle for reading said address indicia and for generating an electrical signal corresponding to the address indicium of the aligned group of receptacles in which said empty receptacle is detected, means successively responsive to said electrical signal corresponding to the tier number and to said electrical signal corresponding to the address indicium for recording a manifestation of said electrical signals, second drive means, means responsive to said electrical signal derived from the first detected empty receptacle and corresponding to said tier number for operatively connecting said second drive means to said carrier means for moving said carrier means from said load position into relation with respect to the corresponding tier on said member, means responsive to said electrical signal corresponding to said tier number of the first detected empty receptacle for rendering said connecting means operative in accordance with a predetermined location of said first detected empty receptacle from said loading station, means arranged on said carrier means and actuatable, upon movement of said article through said transfer position, for moving said article from said carrier means into said first detected empty receptacle on said member, means arranged in said ejecting station for continuously generating a series of electrical signals from said address indicia, means for reading a recorded manifestation of a signal representing the address of a designated receptacle in which an article to be retrieved is stored and for generating new signals representing the tier and address of said designated receptacle, means arranged in said ejecting station and with respect to each tier of receptacles for ejecting the articles stored in any one of said receptacles, means responsive to said new signal corresponding to the tier for conditioning the respective ejecting means, and means responsive to coincidence of said electrical signals derived from said address indicia and said new signal corresponding to said address of said designated receptacle for actuating said ejecting means.

5. The combination in accordance with claim 4 and including means at said transfer position for reading said address indicia and comparing address indicium of the receptacle into which the article is being inserted for storage with the address indicium of the first detected empty receptacle.

6. In a device for storing articles in random order and for retrieving said articles from storage, the combination comprising a rotatable member having a number of receptacles arranged about said member and vertically aligned in a number of tiers, said member carrying address indicia representing each of said receptacles in each vertically aligned group, first drive means operatively connected to said member for imparting continuous rotation thereto, an article loading station arranged adjacent said member, a detecting station arranged ahead of said loading station, an ejecting station, carrier means arranged in said loading station for receiving an article to be stored and for moving said article into one of said receptacles, means, upon being rendered operative, for connecting said first drive means to said carrier means, means arranged in said detecting station with respect to each tier of receptacles and initiated by the article received by said carrier means for generating an electrical signal from the first empty receptacle in any one of said tiers moving through said detecting station, said electrical signal being representative of the tier number, means arranged in said detecting station and responsive to the electrical signal derived from the first empty receptacle for reading said address indicia and for generating an electrical signal corresponding to the address indicium of the aligned group of receptacles in which said empty receptacle is detected, means successively responsive to the electrical signal corresponding to the tier number and to the electrical signal corresponding to said address indicium for recording to manifestation of said signals, second drive means, means responsive to said electrical signal derived from the first detected empty receptacle and corresponding to said tier number for operatively connecting said second drive means to said carrier means for moving said carrier means from said load position into relation with the corresponding tier on said member, means responsive to said electrical signal corresponding to the tier number of the first detected empty receptacle for rendering said connecting means operative in accordance with a predetermined location of said first detected empty receptacle from said loading station, means arranged on said carrier means and actuatable, upon movement of said article through said transfer station, for moving said article from said carrier means into said detected receptacle on said member, means arranged in said loading station for reading said address indicia and comparing the address indicium of the receptacle in which the article is being inserted for storage with the address indicium of the first detected empty receptacle, means arranged in said ejecting station for continuously generating a series of electrical signals from said address indicia, means for reading a recorded manifestation of signals representing the addresses of designated receptacles in which articles to be retrieved are stored and for generating new signals representing the tier and address of each of said designated receptacles, means arranged in said ejecting station and with respect to each tier of receptacles for ejecting the article stored in any one of said receptacles, means responsive to said new signal corresponding to the tier for conditioning the respective ejecting means, means responsive to said new signals for storing a predetermined number of said new signals corresponding to said tier and addresses, and means responsive to coincidence of the electrical signals corresponding to the same address as derived from said address indicia and any one of said addresses in said storing means for actuating only the ejecting means conditioned by the electrical signal corresponding to the tier number forming a part of the matched address.

7. In a device for storing articles in random order the combination comprising a cyclically movable member provided with a plurality of receptacles for receiving the articles to be stored, said member carrying address indicia representing each of said receptacles, carrier means for receiving an article to be stored and adapted, upon actuation of said carrier means, for moving said article into one of said receptacles, means for actuating said carrier means in response jointly to receipt of an article by said carrier means and to movement of a selected empty receptacle to a predetermined position relative to said carrier means, a first detecting means disposed in sensing relation to the indicia on said member for generating a series of signals representing the addresses of all of said receptacles, a second detecting means disposed ahead of said carrier means and in sensing relation to said receptacle for generating a select signal from each empty receptacle, and means responsive to the select signal derived from the first empty receptacle moved past said second detecting means, upon receipt of said article by said carrier means, for recording a manifestation of a signal representing the address of said empty receptacle.

8. In a device for storing articles in random order, the combination comprising a rotatable member provided with a plurality of receptacles for receiving the articles to be stored, said member carrying address indicia representing each of said receptacles, drive means operatively connected to said member for imparting continuous rotation thereto, an article loading station arranged adjacent said member, a detecting station arranged ahead of said loading station, carrier means arranged in said loading station for receiving an article to be stored and for moving said article into one of said receptacles, means, upon being rendered operative, for connecting said drive means to said carrier means, means arranged in said detecting station and initiated by the article received by said carrier means for generating an electrical signal from the first empty receptacle moving through said detecting station, means arranged in said detecting station and responsive to said electrical signal derived from the first detected empty receptacle for generating an electrical signal corresponding to the address indicium of said empty receptacle, means responsive to the electrical signal derived from the first detected empty receptacle for rendering said connecting means operative in accordance with a predetermined location of said first detected empty receptacle from said loading station, and means responsive to the electrical signal corresponding to said indicium of said first detected empty receptacle for recording a manifestation of the address of said empty receptacle.

9. The combination in accordance with claim 8 including means at said loading station for comparing the address indicium of the receptacle into which the article is being inserted for storage with the address indicium of the first detected empty receptacle.

10. In a device for storing articles in random order, the combination comprising a rotatable member provided with a plurality of receptacles for receiving the articles to be stored, said receptacles, being arranged about said member and in a number of tiers, first drive means operatively connected to said member for imparting continuous rotation thereto, an article loading station arranged adjacent said member, a detecting station arranged ahead of said loading station, carrier means arranged in said loading station for receiving an article to be stored and for moving said article into one of said receptacles, means, upon being rendered operative, for connecting said first drive means to said carrier means, second drive means operatively connected to said carrier means for moving said carrier means from said load position to a position in relation to any one of said tiers on said member, means arranged in said detecting station and initiated by the article received by said carrier means for generating an electrical signal from the first empty receptacle in any one of said tiers moving through said detecting station, means responsive to said electrical signal derived from said first detected empty receptacle for rendering said second drive means operative and for rendering said first drive means operative in accordance with a predetermined location of said first detected empty receptacle from said loading station, and means arranged on said carrier means for moving said article from said carrier means into said detected empty receptacle as said receptacle is moved through said loading station.

11. In a device for storing articles in random order, the combination comprising a rotatable member provided with a plurality of receptacles for receiving the articles to be stored, said receptacles being arranged about said member and in a number of tiers and said member carrying address indicia representing each of said receptacles in a tier, first drive means operatively connected to said member for imparting continuous rotation thereto, an article loading station arranged adjacent said member, a detecting station arranged ahead of said loading station, carrier means arranged in said loading station for receiving an article to be stored and for moving said article into one of said receptacles, means, upon being rendered operative, for connecting said first drive means to said carrier means, means arranged in said detecting station with respect to each tier of receptacles and initiated by the article received by said carrier means for generating an electrical signal from the first empty receptacle in any one of said tiers moving through said detecting station, said electrical signal being representative of the tier number, means arranged in said detecting station and responsive to the electrical signal derived from the first empty receptacle for reading said address indicia and for generating an electrical signal corresponding to the address indicium of the aligned group of receptacles in which said empty receptacle is detected, means successively reponsive to said electrical signal corresponding to the tier number and to said electrical signal corresponding to the address indicium for recording a manifestation of said signals, second drive means operatively connected to said carrier means for moving said carrier means from said loading position to a position in relation to any one of said tiers on said member, means responsive to said electrical signal derived from said first detected empty receptacle for rendering said second drive means operative and for rendering said first drive means operative in accordance with a predetermined location of said first detected empty receptacle from said loading station, and means arranged on said carrier means for moving said article from said carrier means into said detected empty receptacle as said receptacle is moved through said loading station.

12. The combination in accordance with claim 11 including means at said loading station for comparing the address indicium of the receptacle into which the article is being inserted for storage with the address indicium of the first detected empty receptacle.

13. In a device for retrieving an article stored in any one of the receptacles arranged about a cyclically movable member, said member carrying address indicia representing each of said receptacles, the combination comprising an ejecting station arranged with respect to said member, detecting means arranged in said ejecting station and disposed in sensing relation to said address indicia for generating a series of signals representing the addresses of all of said receptacles, means for reading a recorded manifestation of a signal representing the address of a designated receptacle in which an article to be retrieved is stored and for generating a new signal representing the address of said designated receptacle, means for receiving and comparing said new signal and said series of signals and said compared signals for generating an output signal, and means arranged in said ejecting station and responsive to said output signal for ejecting the article stored in said designated receptacle as said designated receptacle is moved past said ejecting station.

14. In a device for retrieving an article stored in any one of the receptacles arranged about a cyclically movable member, said member carrying address indicia representing each of said receptacles, the combination comprising an ejecting station arranged with respect to said member, detecting means arranged in said ejecting station and disposed in sensing relation to said address indicia for generating a series of signals representing the addresses of all of said receptacles, means for reading a recorded manifestation of signals representing the addresses of a plurality of designated receptacles in which articles to be retrieved are stored and for generating new signals representing the address of each of said designated receptacles, means responsive to said new signals for storing said new signals, means for receiving and comparing said new signals in said storing means with said series of signals and responsive to coincidence of any one of said new signals with any one of said series of signals for generating an output signal, and means arranged in said ejecting station and responsive to said output signal for ejecting the article stored in said designated receptacle corresponding to the coincident signals as said designated receptacle passes said ejecting means.

15. The combination in accordance with claim 14 in which said receptacles comprise a number of pockets which are pivotally mounted and which are moved about their respective pivot by said ejecting means for discharging the article stored therein.

16. The combination in accordance with claim 14 wherein said ejecting means comprises an air valve for emitting a blast of air against the receptacle for ejecting the article.

17. The combination in accordance with claim 14 wherein the ejected article is delivered into a chute for transmittal to a central collection point.

18. In a device for retrieving an article stored in any one of the receptacles on a cyclically movable member, said receptacles being arranged about said member and vertically aligned in a number of tiers and said member carrying address indicia representing and common to each receptacle in a vertically aligned group of receptacles, the combination comprising an ejecting station arranged with respect to said member, detecting means arranged in said ejecting station and disposed in sensing relation to said address indicia for generating a series of signals representing the common addresses of all of said receptacles in each vertically aligned group of receptacles, means for reading a recorded manifestation of a signal representing the address of a designated receptacle in which an article to be retrieved is stored and for generating new signals representing the tier and address of said designated receptacle, means arranged in said ejecting station and with respect to each tier of receptacles for ejecting the article stored in any one of said receptacles, means responsive to said new signal corresponding to the tier for conditioning the respective ejecting means, and means responsive to coincidence of said new signal corresponding to said address of said designated receptacle and the corresponding signal in said series of signals for actuating said ejecting means associated with said designated receptacle corresponding to said coincident signals.

19. In a device for retrieving an article stored in any one of the receptacles on a cyclically movable member, said receptacles being arranged about said member and vertically aligned in a number of tiers and said member carrying address indicia representing and common to each receptacle in a vertically aligned group of receptacles, the combination comprising an ejecting station arranged with respect to said member, detecting means arranged in said ejecting station and disposed in sensing relation to said address indicia for generating a series of signals representing the common addresses of all of said receptacles in each vertically aligned group of receptacles, means for reading a recorded manifestation of signals representing the addresses of designated receptacles in which the articles to be retrieved are stored and for generating new signals representing the tier and address of each of said designated receptacles, means for storing a predetermined number of said new signals corresponding to the addresses of said designated receptacles, means arranged in said ejecting station and with respect to each tier of receptacles for ejecting the articles stored in any one of said receptacles, means responsive to each of said new signals corresponding to the tier for conditioning the respective ejecting means, and means responsive to coincidence of any one of said new signals in said storing means with the corresponding signal in said series of signals for actuating said ejecting means associated with said designated receptacle corresponding to said coincident signals.

20. The combination in accordance with claim 19 wherein said ejecting means comprises a pneumatic valve for ejecting the article from said designated receptacle as said receptacle moves through said ejecting station.

21. In a device for moving an article from a load position through an eject position in the same plane as said load position, the combination comprising drive means, a receptacle normally maintained in said load position for receiving said article, means mounted within said receptacle for ejecting said article, means for supporting said receptacle and providing a closed path of movement therefor from and to said load position and through said eject position, said load position and said eject position being at substantially opposite sides of said closed path, means responsive to insertion of said article into said receptacle for interconnecting said drive means and said supporting means to move said receptacle in said closed path, and means arranged on said supporting means and with respect to said eject position for engaging and actuating said ejecting means as said receptacle passes through said eject position.

22. The combination in accordance with claim 21 wherein said ejecting means is slidably mounted within said receptacle and said actuating means comprises a cam arranged in fixed relation to said eject position.

23. The combination in accordance with claim 21 including means actuated by said receptacle as it enters said load position for disconnecting said supporting means from said drive means.

24. The combination in accordance with claim 21 including means actuated when in said eject position for guiding said article as it is ejected from said receptacle.

25. In a device for moving an article from a load position through an eject position in the same horizontal plane as said load position and through an eject position in any one of several horizontal planes parallel to and spaced from said same plane, the combination comprising vertical guide means including a fixed member and a rotatable member spaced from and parallel to said fixed member, carrier means slidably mounted on said guide means and including a driven member mounted on said rotatable member and movable therewith, a second driven member freely rotatable on said fixed member and an endless member encircling each of said driven members, a receptacle secured to said endless member and normally maintained in said load position for receiving said article, means mounted within said receptacle for ejecting said article, first drive means operatively connected to said rotatable member for moving said receptacle in a closed path about said driven members from said load position on one side of said guide means and through said eject position on the opposite side of said guide means, second drive means operatively connected to said carrier means for moving said carrier means and said receptacle from said load position to and from any one of said spaced horizontal planes, means responsive to the establishment of an eject position for selectively initiating said first drive means and said second drive means, and means arranged on said carrier means and with respect to said eject position for engaging and actuating said ejecting means as said receptacle passes through said eject position.

26. The combination in accordance with claim 25 and including means arranged in each of said several horizontal planes for selectively controlling the movement of said carrier means into its respective plane to establish the eject position in said selected plane.

27. The combination in accordance with claim 25 and including means connected to and movable with said carrier means for counter-balancing said carrier means and said receptacle.

28. The combination in accordance with claim 25 including means connected to and movable with said carrier means for counter-balancing said carrier means and said receptacle, and means connected to and movable with said counter-balancing means for selectively controlling the movement of said carrier means into its respective plane to establish the ejected position in said selected plane.

29. The combination in accordance with claim 25 and including means connected to and movable with said carrier means for counter-balancing said carrier means and said receptacle, and means connected to and movable with said counter-balancing means for controlling the maximum movement of said carrier means in a vertical direction by said second drive means.

30. The combination in accordance with claim 25 and including means arranged in each of said several horizontal planes and in a position with respect to said eject position for receiving the article ejected from said receptacle.

References Cited in the file of this patent

UNITED STATES PATENTS

| | | |
|---|---|---|
| 2,696,921 | Des Jardins | Dec. 14, 1954 |
| 2,707,666 | Becker | May 3, 1955 |
| 2,745,493 | Furman | May 15, 1956 |
| 2,795,328 | Tyler | June 11, 1957 |
| 2,823,811 | Temple | Feb. 18, 1958 |
| 2,918,656 | Nolde | Dec. 22, 1959 |

FOREIGN PATENTS

| | | |
|---|---|---|
| 717,018 | Great Britain | Oct. 20, 1954 |